US012497830B2

(12) United States Patent
Graybar et al.

(10) Patent No.: US 12,497,830 B2
(45) Date of Patent: Dec. 16, 2025

(54) MOTORIZED SHADE AND WAND ASSEMBLY

(71) Applicant: Springs Window Fashions, LLC, Middleton, WI (US)

(72) Inventors: Michael Allen Graybar, Madison, WI (US); Russell Monroe Jungers, Madison, WI (US); Eric Nathan Krantz-Lilienthal, Janesville, WI (US)

(73) Assignee: Springs Window Fashions, LLC, Middleton, WI (US)

( * ) Notice: Subject to any disclaimer, the term of this patent is extended or adjusted under 35 U.S.C. 154(b) by 0 days.

(21) Appl. No.: 18/337,333

(22) Filed: Jun. 19, 2023

(65) Prior Publication Data

US 2023/0332466 A1 Oct. 19, 2023

Related U.S. Application Data

(62) Division of application No. 17/139,580, filed on Dec. 31, 2020, now Pat. No. 11,686,151.

(51) Int. Cl.

*E06B 9/72* (2006.01)
*E06B 9/42* (2006.01)
*E06B 9/68* (2006.01)

(52) U.S. Cl.

CPC .................. *E06B 9/72* (2013.01); *E06B 9/42* (2013.01); *E06B 2009/6809* (2013.01)

(58) Field of Classification Search

CPC ....... E06B 9/42; E06B 9/72; E06B 2009/6809
See application file for complete search history.

(56) References Cited

U.S. PATENT DOCUMENTS 5,603,371 A 2/1997 Gregg
5,848,634 A 12/1998 Will et al.
6,089,303 A 7/2000 Metcalf et al.
(Continued)

FOREIGN PATENT DOCUMENTS

EP 010009 A2 2/1984
EP 1500776 A2 1/2005
(Continued)

OTHER PUBLICATIONS

International Search Report with Written Opinion for related Application No. PCT/US2021/065521 dated Mar. 22, 2022 (14 Pages).
(Continued)

*Primary Examiner* — Beth A Stephan
(74) *Attorney, Agent, or Firm* — Michael Best & Friedrich LLP

(57) ABSTRACT

A member configured to connect a roller tube of a roller shade to a motor, the member includes a body defining a plurality of first outer walls and a plurality of second outer walls, the first outer walls being offset from the second outer walls, and a mounting hub defining an aperture through the body, the mounting hub is configured to engage a drive shaft of the motor. In addition, a crown member configured to engage an end of a roller tube of a roller shade, the crown member includes an internal aperture defined by a crown member body, and a plurality of arms that project away from the internal aperture, each of the plurality of arms being oriented at an oblique angle to the internal aperture.

20 Claims, 30 Drawing Sheets

(56) References Cited

U.S. PATENT DOCUMENTS

| | | | | |
|---|---|---|---|---|
| 6,910,515 | B2 | 6/2005 | Nien | |
| 7,204,292 | B2 | 4/2007 | Nien | |
| 7,880,409 | B2 | 2/2011 | Miller | |
| 9,371,687 | B2 | 6/2016 | Yu et al. | |
| 9,371,691 | B2 | 6/2016 | Yu et al. | |
| 9,890,588 | B2 * | 2/2018 | Smith | E06B 9/62 |
| 10,104,997 | B2 | 10/2018 | Pham et al. | |
| 10,323,456 | B2 | 6/2019 | Lin | |
| 10,407,983 | B2 | 9/2019 | Holt et al. | |
| 10,538,963 | B2 | 1/2020 | Anthony et al. | |
| 10,975,618 | B2 | 4/2021 | Lin | |
| 11,239,774 | B2 | 2/2022 | Becker | |
| 2004/0035535 | A1 | 2/2004 | Petrongolo | |
| 2004/0103995 | A1 | 6/2004 | Nien | |
| 2006/0021714 | A1 | 2/2006 | Carmen, Jr. et al. | |
| 2006/0283559 | A1 | 12/2006 | Mccormick et al. | |
| 2006/0284585 | A1 | 12/2006 | Kovach et al. | |
| 2010/0018656 | A1 | 1/2010 | Fujita et al. | |
| 2014/0216668 | A1 | 8/2014 | Kim | |
| 2014/0311686 | A1 | 10/2014 | Yu et al. | |
| 2015/0007946 | A1 | 1/2015 | Yu et al. | |
| 2017/0081916 | A1 | 3/2017 | Greening | |
| 2017/0362888 | A1 | 12/2017 | Vinogradova et al. | |
| 2018/0106105 | A1 | 4/2018 | Anthony et al. | |
| 2018/0112461 | A1 * | 4/2018 | Holt | E06B 9/42 |
| 2018/0298682 | A1 | 10/2018 | Huang et al. | |
| 2018/0355666 | A1 | 12/2018 | Lin | |
| 2019/0040676 | A1 | 2/2019 | Mullet et al. | |
| 2019/0045961 | A1 | 2/2019 | Pham et al. | |
| 2019/0100961 | A1 | 4/2019 | Kutell et al. | |
| 2019/0100962 | A1 | 4/2019 | Smith et al. | |
| 2019/0352964 | A1 | 11/2019 | Kasai | |
| 2020/0080367 | A1 | 3/2020 | Daugaard | |
| 2020/0284093 | A1 | 9/2020 | Dahlgren et al. | |
| 2020/0332595 | A1 | 10/2020 | Anthony et al. | |

FOREIGN PATENT DOCUMENTS

| | | | |
|---|---|---|---|
| EP | 1500777 | A1 | 1/2005 |
| EP | 1617036 | A2 | 1/2006 |
| EP | 1435425 | B1 | 6/2008 |
| EP | 2476859 | B1 | 10/2018 |
| KR | 102191058 | B1 | 12/2020 |
| WO | 2018195580 | A1 | 11/2018 |
| WO | 2020106207 | A1 | 5/2020 |

OTHER PUBLICATIONS

European Patent Office Action for Application No. 21916422.5 dated Nov. 7, 2024 (8 pages).

* cited by examiner

MOTORIZED SHADE AND WAND ASSEMBLY

CROSS-REFERENCE TO RELATED APPLICATIONS

This application is a divisional of U.S. patent application Ser. No. 17/139,580, filed on Dec. 31, 2020, entitled "Motorized Shade and Wand Assembly," the entire contents of which is hereby incorporated by reference in its entirety.

FIELD

The present invention relates to a covering for an architectural opening. More specifically, the present invention relates to a motorized covering that can include a wand assembly for selectively adjusting a position of the covering relative to the architectural opening.

SUMMARY

A motorized shade assembly includes a motor assembly operably connected to adjust a position of a covering relative to an architectural opening, a bracket assembly for supporting the motor assembly relative to the architectural opening, and a control wand assembly coupled to the motor assembly by a ball and socket connection, wherein one of a ball joint or a socket is coupled to a portion of the motor assembly, and the other of the socket or the ball joint is coupled to the control wand assembly, the socket receives the ball joint to selectively connect the control wand assembly to the motor assembly.

Other features and aspects of the invention will become apparent by consideration of the following detailed description and accompanying drawings.

Figure 1:
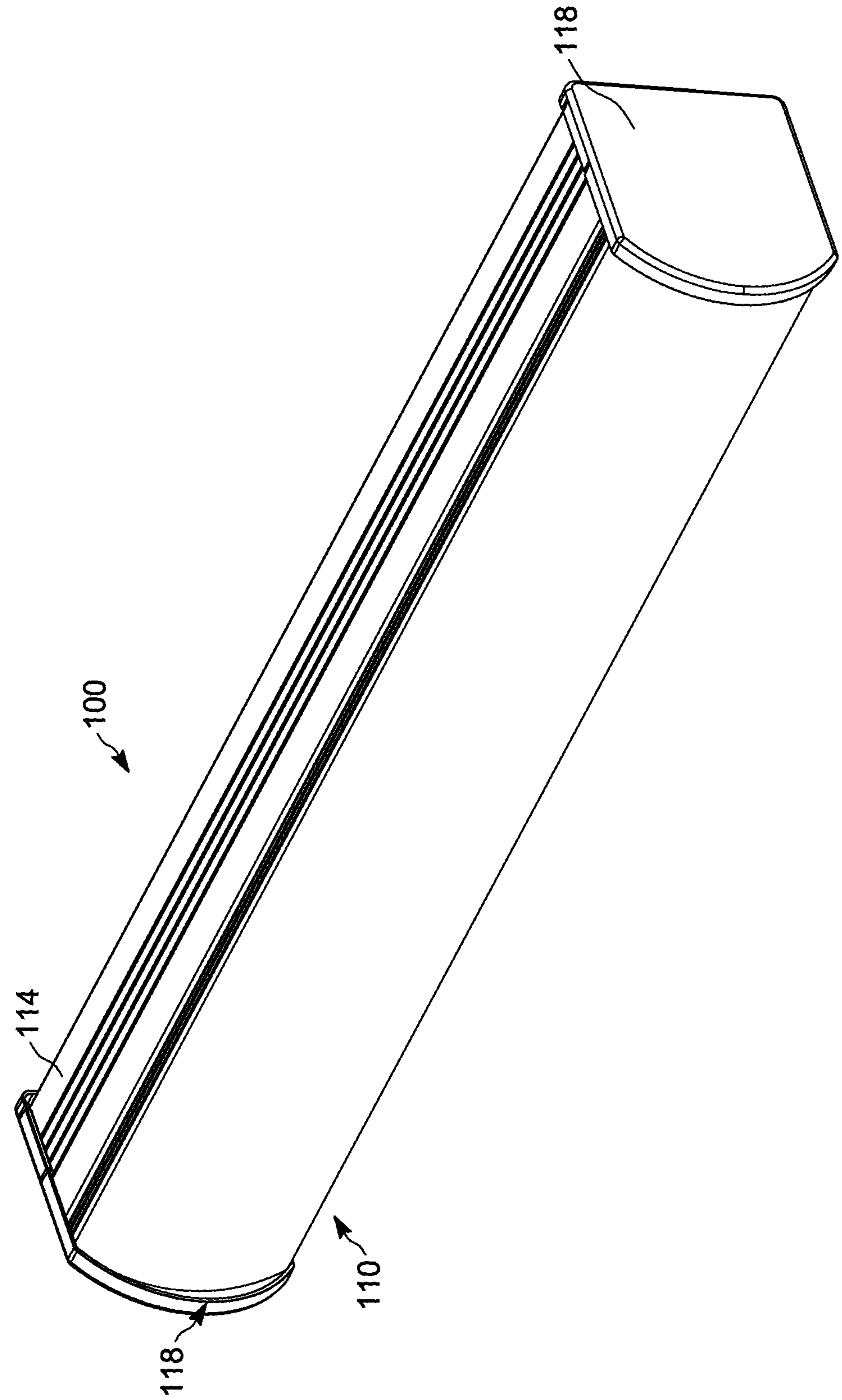
FIG. 1 is a perspective view of an embodiment of a motorized roller shade assembly shown detached from an architectural opening and with a wand assembly removed.

Before any embodiments of the present invention are explained in detail, it should be understood that the invention is not limited in its application to the details or construction and the arrangement of components as set forth in the following description or as illustrated in the drawings. The invention is capable of other embodiments and of being practiced or of being carried out in various ways. It should be understood that the description of specific embodiments is not intended to limit the disclosure from covering all modifications, equivalents and alternatives falling within the spirit and scope of the disclosure. Also, it is to be understood that the phraseology and terminology used herein is for the purpose of description and should not be regarded as limiting.

DETAILED DESCRIPTION

The invention illustrated in the figures and disclosed herein is generally directed to a motorized roller shade assembly 100 for selectively adjusting a position of a covering relative to an architectural opening. The motorized roller shade assembly 100 includes a cover assembly 110 (shown in FIG. 1), a bracket assembly 120 (shown in FIGS. 2-3), and a motorized roller tube assembly 130 (shown in FIGS. 2-3). A wand assembly 400 (shown in FIGS. 28-31) is configured to be selectively attached to the motorized roller shade assembly 100, and includes one or more controls to allow a user to adjust a position of the covering of the motorized roller shade assembly 100 relative to the architectural opening.

For ease of discussion and understanding, the following detailed description will refer to an architectural opening. It should be appreciated that the architectural opening can include any suitable opening in a building or other structure, such as a window, a door, a skylight, and/or an open-air opening. The detailed description will also refer to a window, which is provided as an example of an architectural opening for ease of understanding one or more aspects of the innovation. The term window should be construed to include not only a window, but any other suitable architectural opening that the innovation described herein can be used to selectively cover.

With reference to FIG. 1, the motorized roller shade assembly 100 (or motorized shade assembly 100) includes a cover assembly 110. The cover assembly 110 includes a decorative housing 114 (or cassette 114) and a plurality of end caps 118. The decorative housing 114 substantially surrounds (or encloses) operational components of the roller shade assembly 100 (e.g., a motorized roller tube assembly 130 (see FIGS. 2-3), etc.). Each of the end caps 118 engage a corresponding bracket 124 (see FIGS. 2-3). In addition, each of the end caps 118 engage an opposing end of the decorative housing 114. Each end cap 118 covers each bracket 124, concealing the bracket 124 with a decorative covering. The decorative housing 114 and end caps 118 define a headrail.

Figure 2:
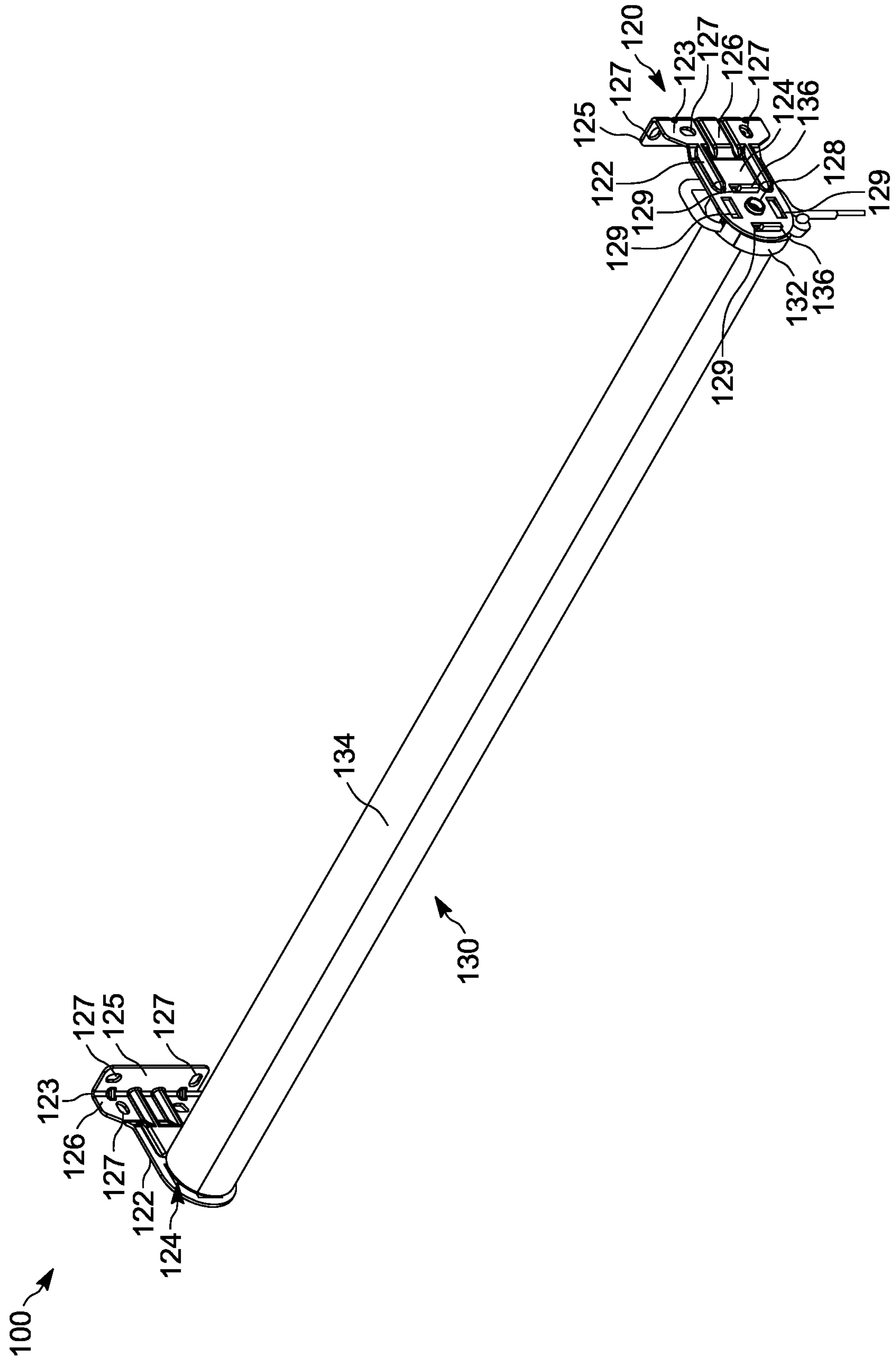
FIG. 2 is a perspective view of the motorized roller shade assembly of FIG. 1 shown with a decorative cover removed.

FIG. 2 is a perspective view of the motorized roller shade assembly 100 with the cover assembly 110 removed. The bracket assembly 120 includes a plurality of bracket members 122 (or brackets 122). In the illustrated embodiment, the bracket members 122 include a pair of bracket members 122 and are substantially identical. The bracket members 122 are oriented to face each other (i.e., one bracket member 122 is rotated 180 degrees to, or is a mirror image of, the other bracket member 122). Each bracket member 122 includes a mounting portion 123 and a roller tube support portion 124. The pair of bracket members 122 can be referred to as a first bracket member 122 and a second bracket member 122.

The mounting portion 123 includes a first mounting face 125 and a second mounting face 126. The first and second mounting faces 125, 126 are oriented at an angle to each other. For example, the mounting faces 125, 126 are oriented approximately perpendicular (or orthogonal) to each other. In other embodiments, the mounting faces 125, 126 can be oriented at an oblique angle to each other. Each mounting face 125, 126 includes at least one mounting aperture 127. In the illustrated embodiment, each mounting face 125, 126 includes a plurality of mounting apertures 127 (or at least two mounting apertures 127). The mounting apertures 127 are each configured to receive a fastener (e.g., a screw, a bolt, a nail, etc.). The mounting faces 125, 126 and associated mounting aperture 127 facilitate attachment of each bracket member 122 at different locations relative to the architectural opening. For example, the first mounting face 125 and/or the second mounting face 126 can be used to attach each bracket member 122 relative to the architectural opening (e.g., to facilitate attachment within a perimeter of the architectural opening, outside of the perimeter of the architectural opening, to a window frame, to a wall or other structure outside of the window frame, etc.).

The roller tube support portion 124 includes an aperture 128 and a plurality of slots 129. In the illustrated embodiment, at least two slots 129 are parallel and positioned on opposing sides of the aperture 128. In other embodiments, the roller tube support portion 124 can include a single slot 129, or more than two parallel slots 129. Each bracket member 122, and more specifically each roller tube support portion 124, can further include a plurality of pairs of parallel slots 129 (or groupings of parallel slots 129). In the illustrated embodiment, a first pair of parallel slots 129 is oriented perpendicular to a second pair of parallel slots 129. Each grouping of parallel slots 129 is configured to receive an associated hook member positioned on one end of the motorized roller tube assembly 130. Additional groupings of parallel slots 129 can advantageously provide mounting options for the roller shade assembly 100 relative to the architectural opening. For example, and with reference to FIG. 2, the motorized roller tube assembly 130 is shown coupled to a first pair of the parallel slots 129 by hook members 136. The second pair of parallel slots 129, which are unused in FIG. 2, can facilitate an alternate mounting orientation, where the bracket member 122 is rotated ninety degrees (90) around an axis defined by the aperture 128. In that rotated position, the first mounting face 125 is positioned above or below the motorized roller tube assembly 130, and the second pair of parallel slots 129 can be used to receive the hook members to couple the motorized roller tube assembly 130 to the bracket member 122. In other embodiments of the bracket member 122 (such as bracket member **122*a* shown in FIG. 3), the bracket member 122*a* can include a single pair of parallel slots 129**.

The motorized roller tube assembly 130 includes a first non-rotating portion 132 and a second rotating portion 134. The first portion 132, which is stationary relative to the bracket assembly 120, and more specifically to the bracket member 122 to which it is coupled, includes at least one mounting hook 136. As shown in FIG. 2, the first portion 132 includes a plurality of hook members 136 (or mounting hooks 136), depicted as two mounting hooks 136. In other embodiments, the first portion 132 can include a single hook member 136, or any suitable number of hook members 136 to fasten the motorized roller tube assembly 130 to one bracket member 122 of the bracket assembly 120. The second portion 134, which moves or rotates relative to the bracket assembly 120, and more specifically to the bracket member 122 to which it is coupled. The second portion 134 rotates around an axis defined by the aperture 128. As discussed in additional detail below, the hook members 136 couple one end of the motorized roller tube assembly 130

(the first portion 132) to one bracket member 122 of the bracket assembly 120. The other end of the motorized roller tube assembly 130 (the second portion 134) engages (or is coupled) to the other bracket member 122 of the bracket assembly 120 by the aperture 128. Accordingly, the first portion 132 of the motorized roller tube assembly 130 does not rotate relative to the bracket member 122 to which it is attached (i.e., is stationary), while the second portion 134 of the motorized roller tube assembly 130 does rotate relative to the bracket member 122 to which it is attached (i.e., is not stationary).

Figure 3:
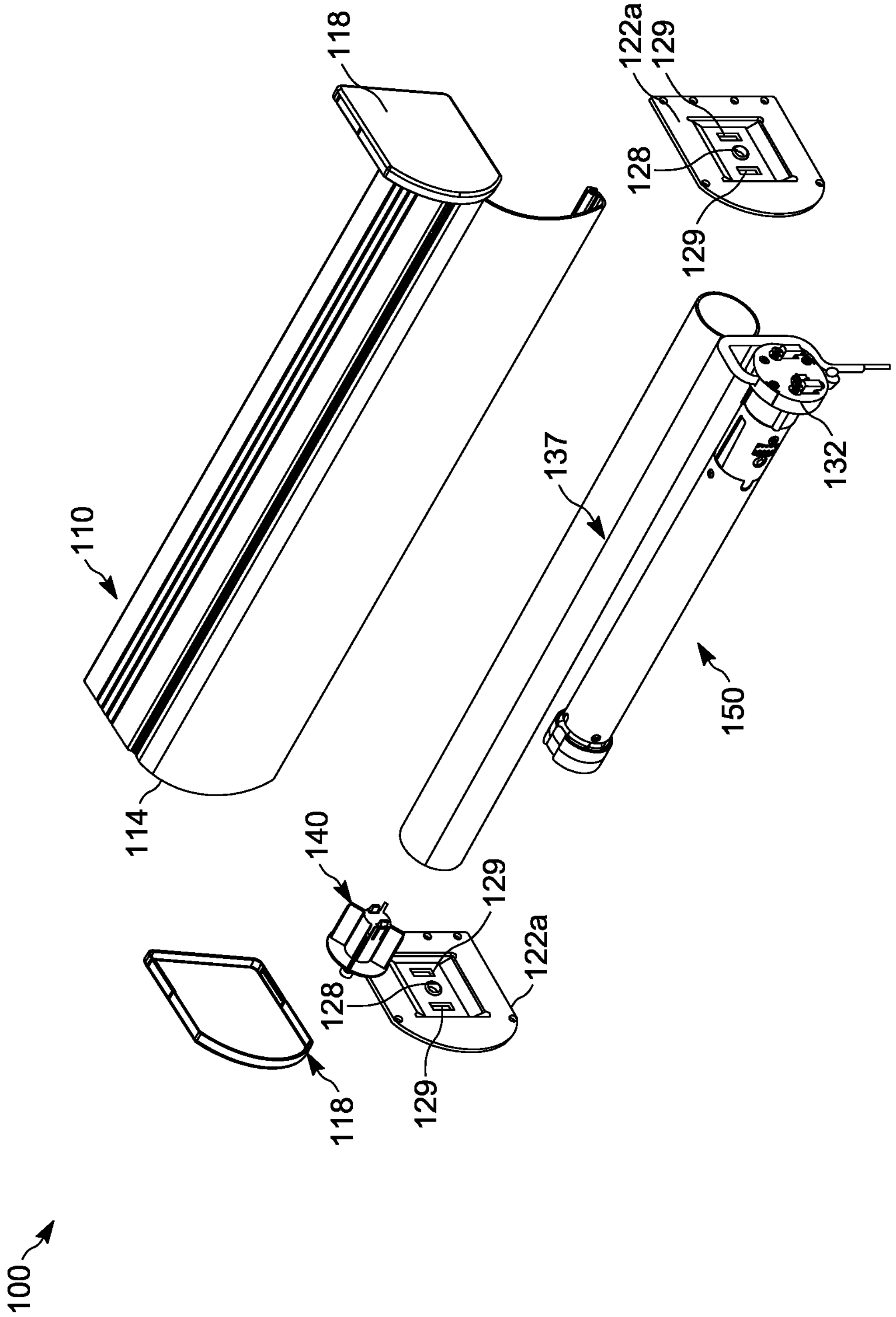
FIG. 3 is a partially exploded view of the motorized roller shade assembly of FIG. 1.
Figure 4:
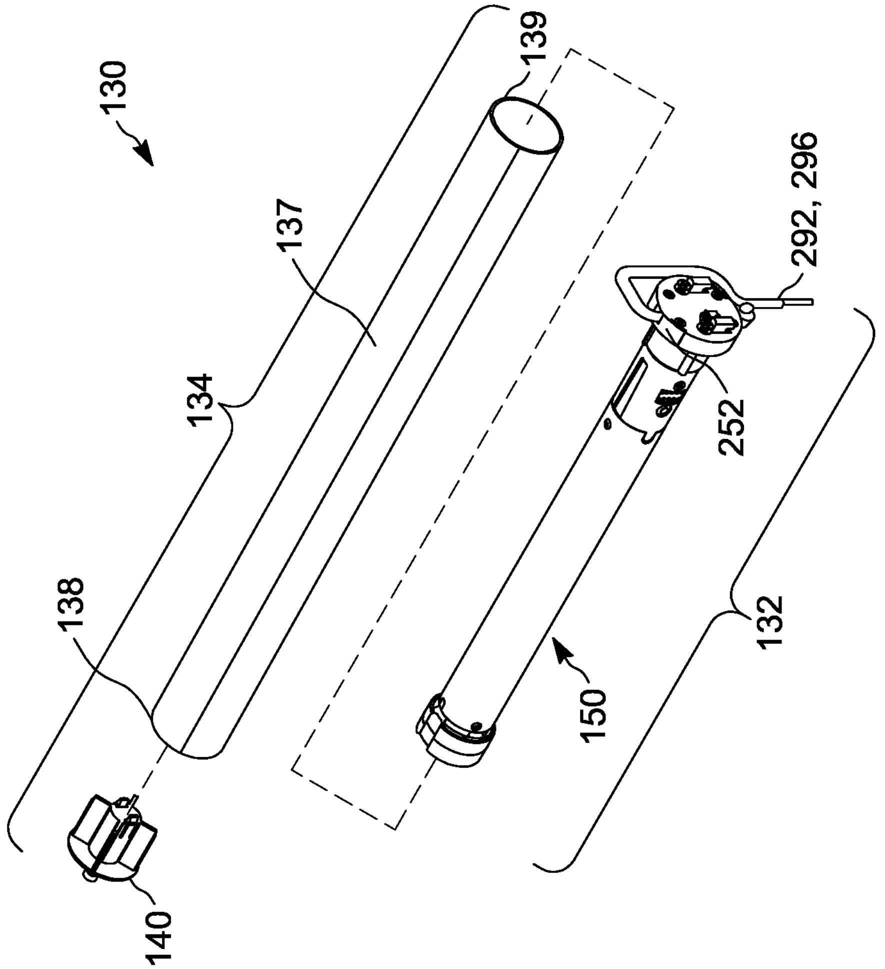
FIG. 4 is a partially exploded view of the motorized roller tube assembly associated with the motorized roller shade assembly of FIG. 1.

With reference now to FIGS. 3-4, the motorized roller tube assembly 130 includes a roller tube 137, an idler member 140, and a motor assembly 150. With specific reference to FIG. 4, the roller tube 137 is a substantially hollow tube that includes a first end 138 opposite a second end 139. The roller tube 137 receives the idler member 140 in the first end 138, and the motor assembly 150 in the second end 139. It should be appreciated that the first portion 132 (or the non-rotating portion 132) of the motorized roller tube assembly 130 includes the motor assembly 150. The second portion 134 (or rotating portion 134) of the motorized roller tube assembly 130 includes the roller tube 138 and the idler member 140. The roller tube 137 is configured to carry a covering (or covering material) (not shown). For example, the covering can be a roller shade material that is configured to be operably engaged with the roller tube 137. Rotation of the roller tube 137 in a first direction unwinds the covering material from the roller tube 137, covering (or blocking) a portion of the architectural opening. Rotation of the roller tube 137 in a second direction, opposite the first direction, winds the covering material onto the roller tube 137, uncovering (or unblocking) a portion of the architectural opening. The portion of the architectural opening noted in the winding and unwinding of the covering material can include the entirety of the architectural opening. While the covering material is discussed as a roller shade material, in other embodiments the covering material can be a cellular fabric, a double-cell cellular fabric, a pleated fabric, Venetian blinds, Roman shades, a natural material (e.g., bamboo, etc.), or any other suitable window treatment or material that is configured to cover an architectural opening or a window, and limit, reduce, or block light, or otherwise serve as a shade.

Figure 5:
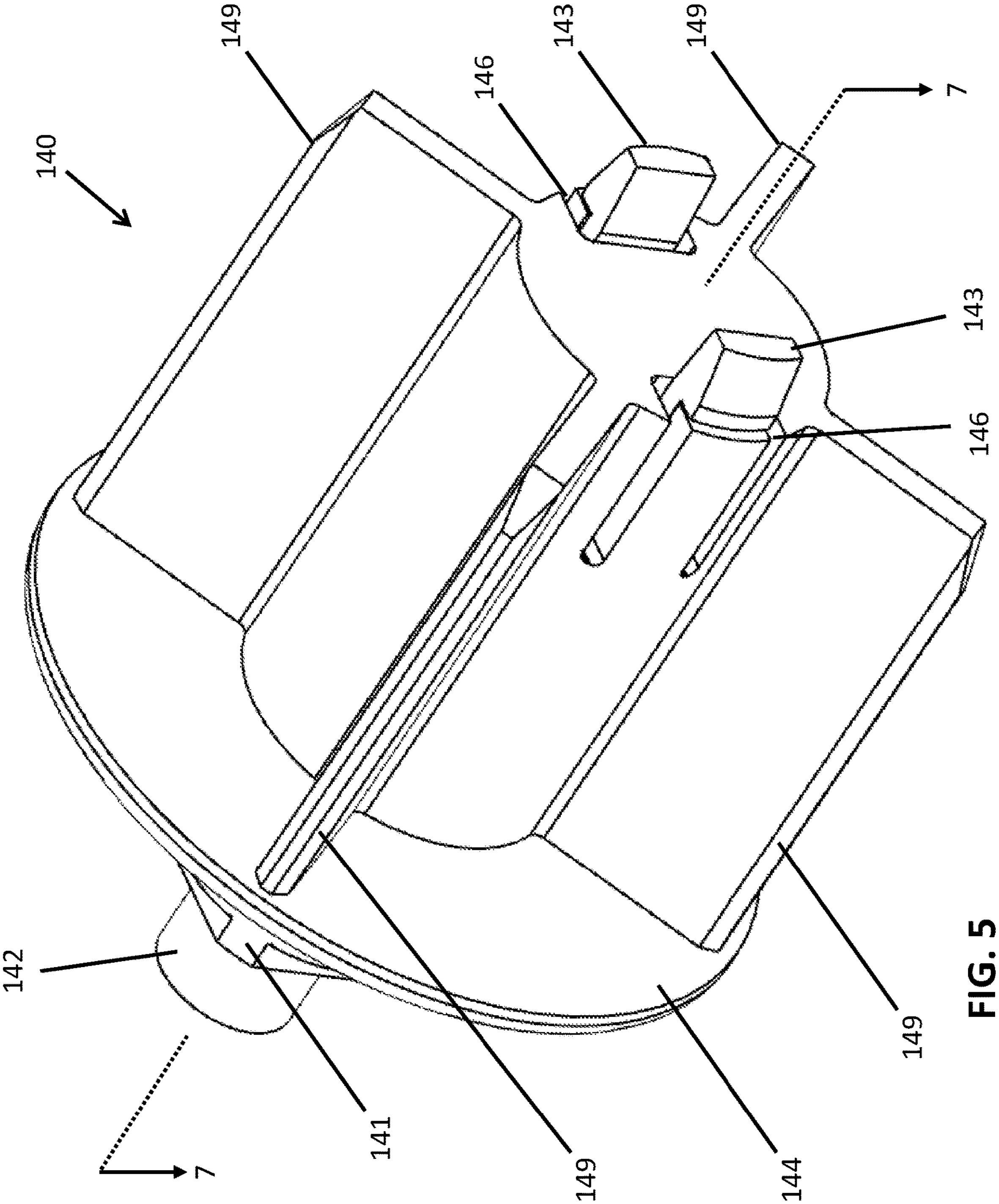
FIG. 5 is a perspective view from a first end of an idler member of a rotating portion of the motorized roller tube assembly shown in FIG. 4.
Figure 6:
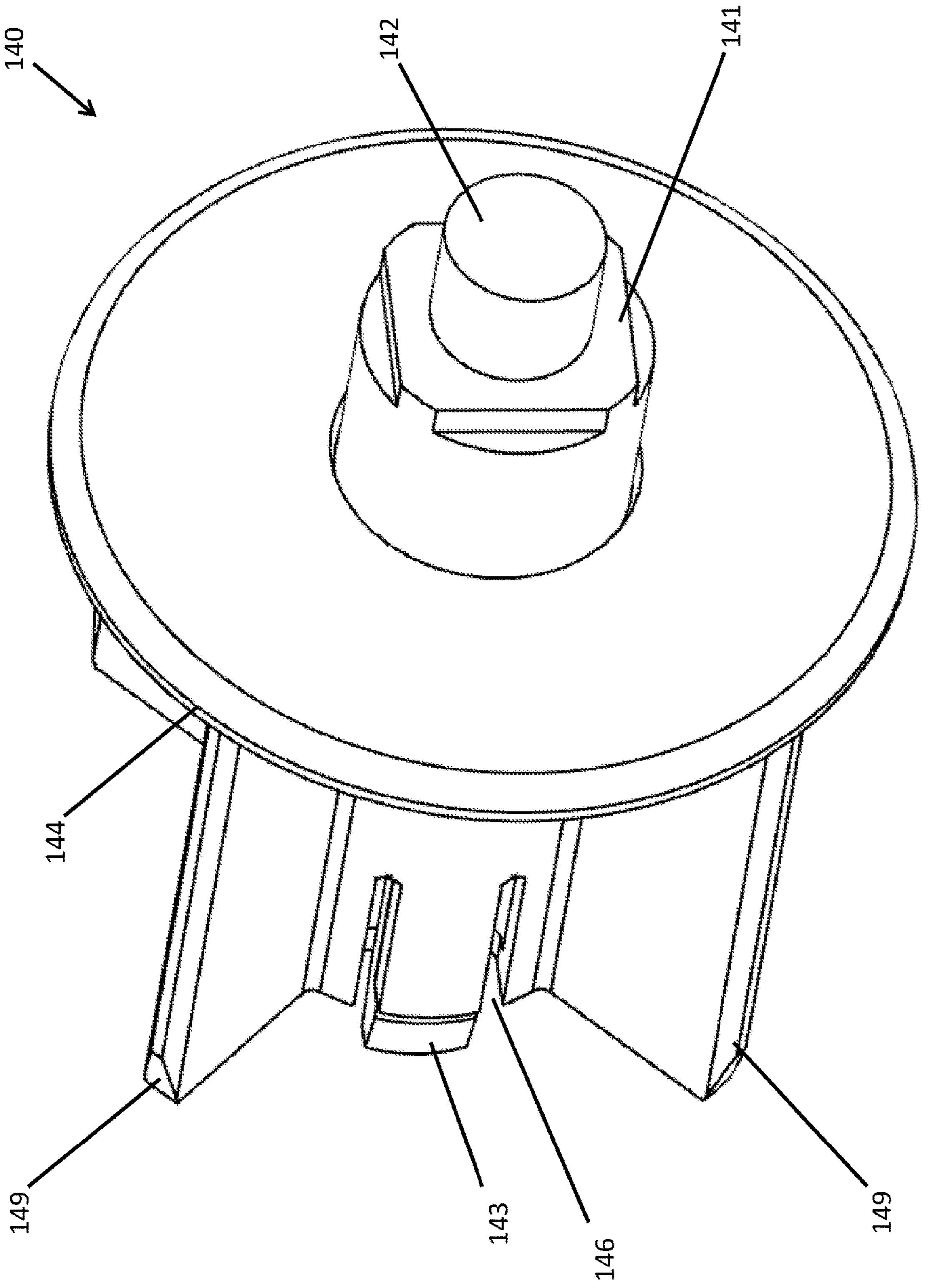
FIG. 6 is a perspective view of from a second end, opposite the first end, of the idler member of FIG. 5.
Figure 7:
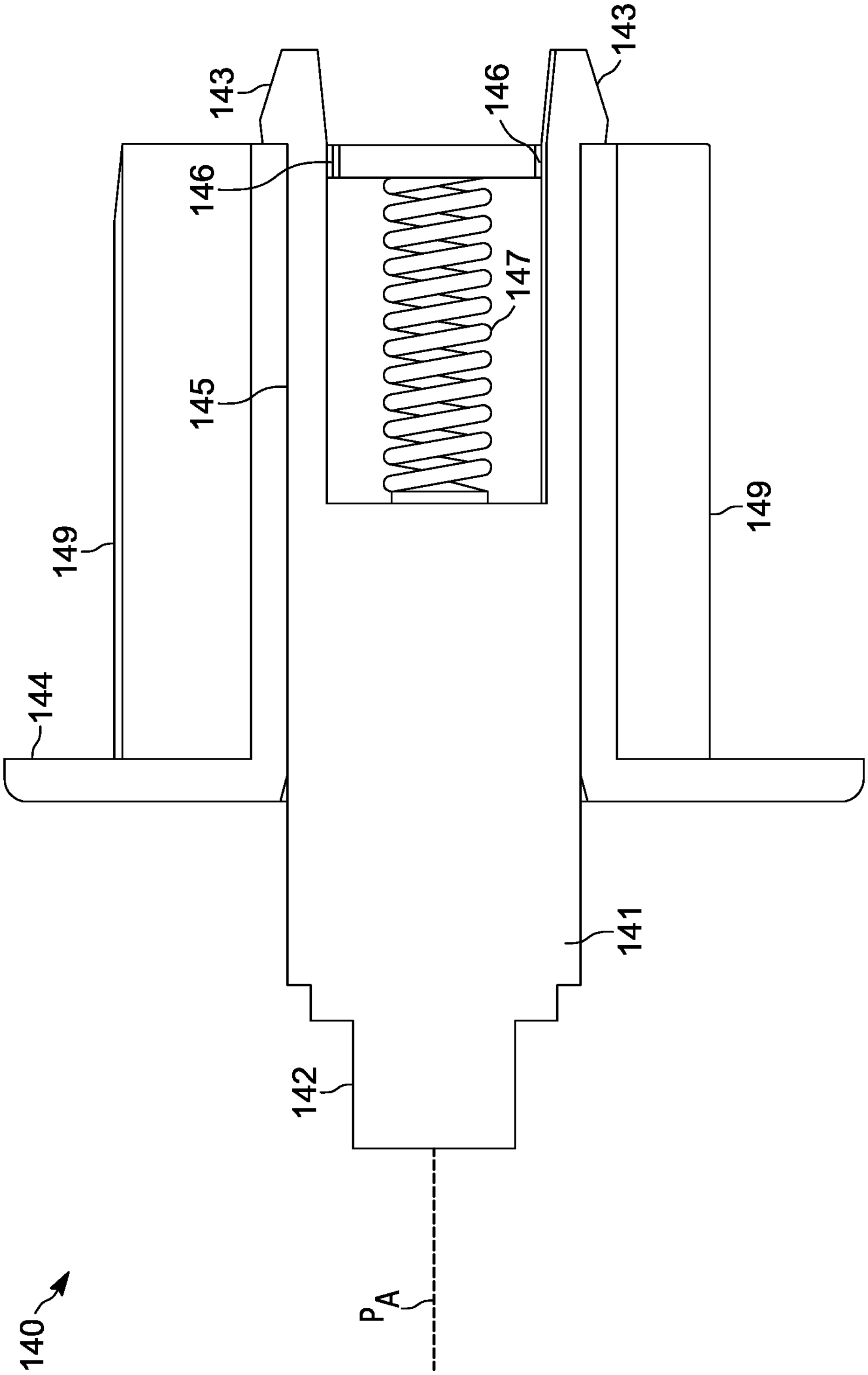
FIG. 7 is a cross-sectional view of the idler member, taken along line 7-7 of FIG. 5.

FIGS. 5-7 illustrate the idler member 140. The idler member 140 includes a pin member 141 that defines a pin 142. The pin member 141 also includes a plurality of hook members 143. The hook members 143 are positioned at an end of the pin member 141 opposite the pin 142. In the illustrated embodiment, the pin member 141 defines two hook members 143. In other embodiments, the pin member 141 can define a single hook member 143, or three or more hook members 143.

The pin member 141 is received by a tube engaging member 144. With specific reference to FIG. 7, the tube engaging member 144 defines a channel 145. The channel 145 extends through the tube engaging member 144 and includes a plurality of outlet apertures 146. Each outlet aperture 146 is configured to receive one hook member 143 of the pin member 141. Accordingly, in the illustrated embodiment, the channel 145 includes two outlet aperture 146. In other embodiments, the channel 145 can include a single outlet aperture 146, or three or more outlet apertures 146.

A biasing member 147 is positioned in the channel 145. One end of the biasing member 145 contacts the pin member 141 while the second, opposite end of the biasing member 145 contacts the tube engaging member 144. The biasing member 147 applies a biasing force against the pin member 141 along an axis PA defined by the pin 142. The pin member 141 is also configured to slide relative to the tube engaging member 144 along the axis PA. With the bias applied, the pin member 141 is retained in engagement with the tube engaging member 144 by the hook members 143. More specifically, each hook member 143 engages the tube engaging member 144 to restrict further movement of the pin member 141 relative to the tube engaging member 144. The biasing force of the biasing member 147 can be overcome by applying an external force on the pin 142 along the axis PA. This external force slides the pin member 141 relative to the tube engaging member 144, with the pin 142 moving closer to the tube engaging member 144.

With reference back to FIGS. 5-7, the tube engaging member 144 includes a plurality of tines 149. The tines 149 extend from the channel 145 and are configured to engage an inner surface (or internal circumference) of the roller tube 137. While four tines 149 are illustrated, in other embodiment the tube engaging member 144 can includes a single tine 149, two or more tines 149, or any suitable number of tines 149 sufficient to engage the roller tube 137. The tines 149 can also be biased toward engagement with the inner surface of the roller tube 137.

Figure 8:
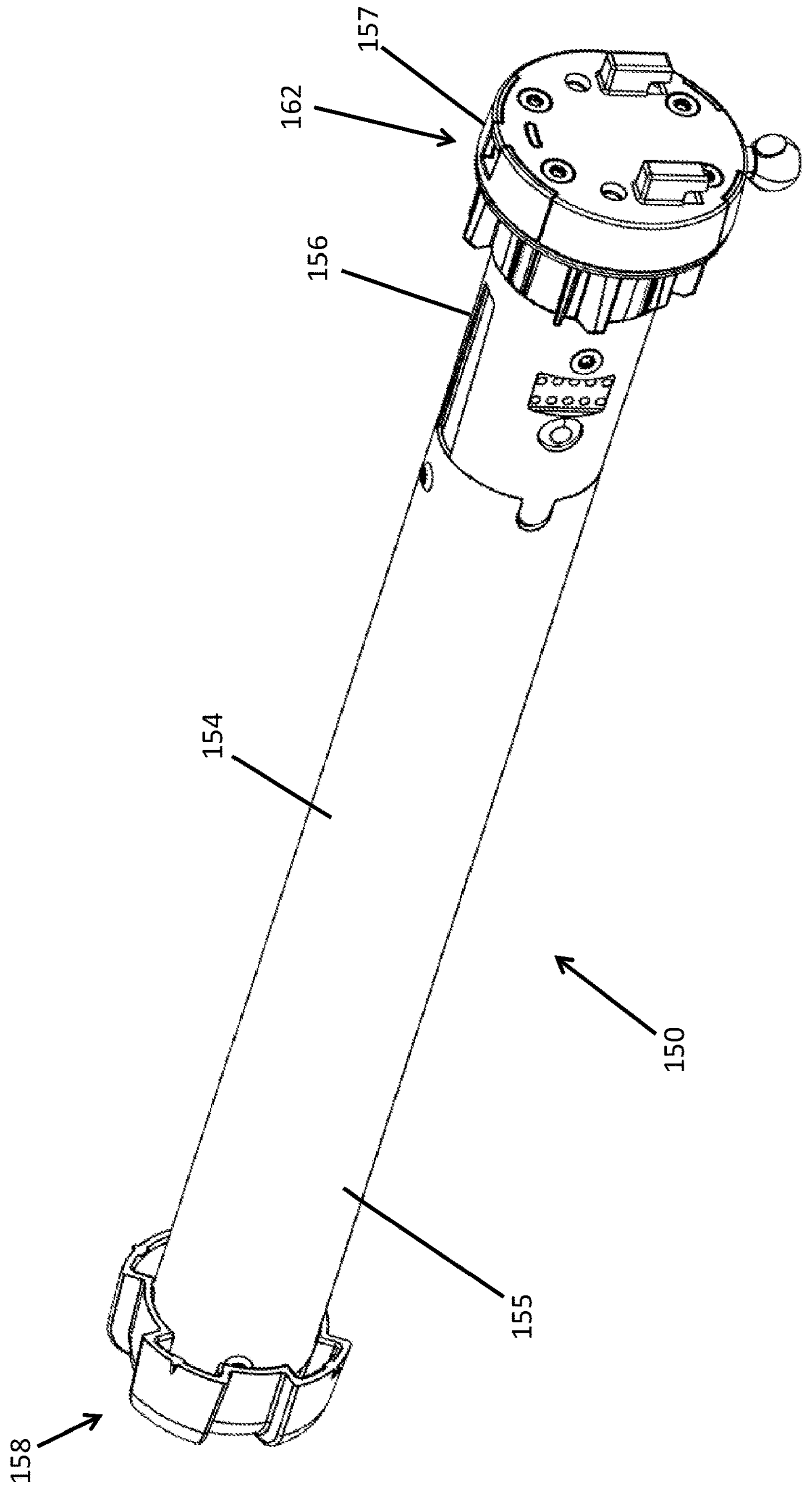
FIG. 8 is a perspective view from a first end of the motor assembly of the motorized roller tube assembly shown in FIG. 4.
Figure 9:
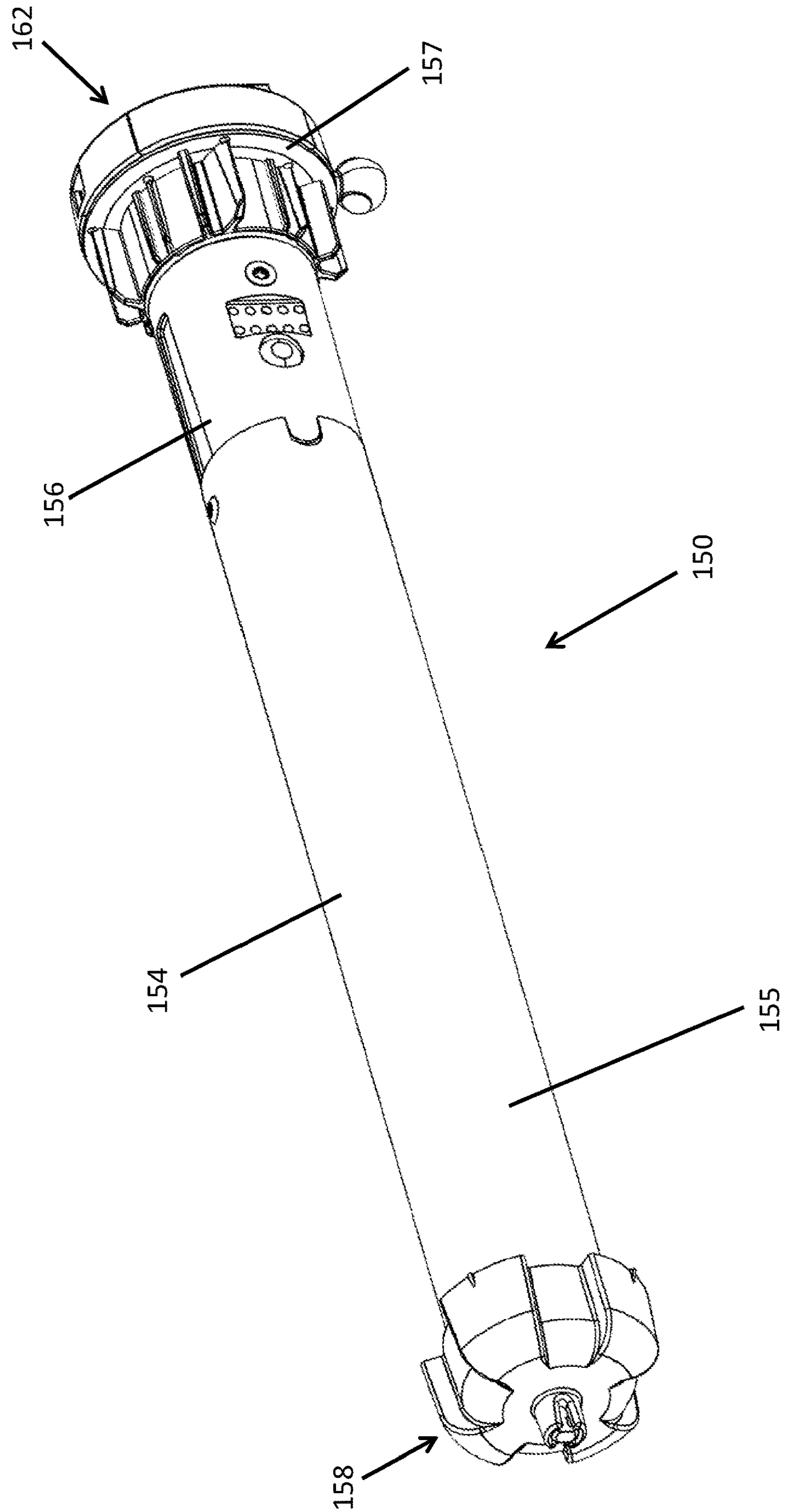
FIG. 9 is a perspective view of from a second end, opposite the first end, of the motor assembly of FIG. 8.

With reference now to FIGS. 8-9, the motor assembly 150 is illustrated with a wand communication wire harness and a power input wire harness detached for clarity. The motor assembly 150 includes a motor housing 154, a mounting housing 157, a roller tube engaging portion 158, and a mounting portion 162. The roller tube engaging portion 158 is coupled to a first end 166 (or drive end 166) of the motor housing 154 (see FIG. 10). The mounting portion 162 is coupled to a second end 168 (or mounting end 168) of the motor housing 154 (see FIGS. 24-25). In the illustrated embodiment, the motor housing 154 is defined by a first housing portion 155 and a second housing portion 156. The first and second housing portions 155, 156 are substantially hollow and tubular in shape. In other embodiments, the first and second housing portions 155, 156 can be formed of a single continuous housing, or a plurality of housing portions (e.g., three or more).

Figure 10:
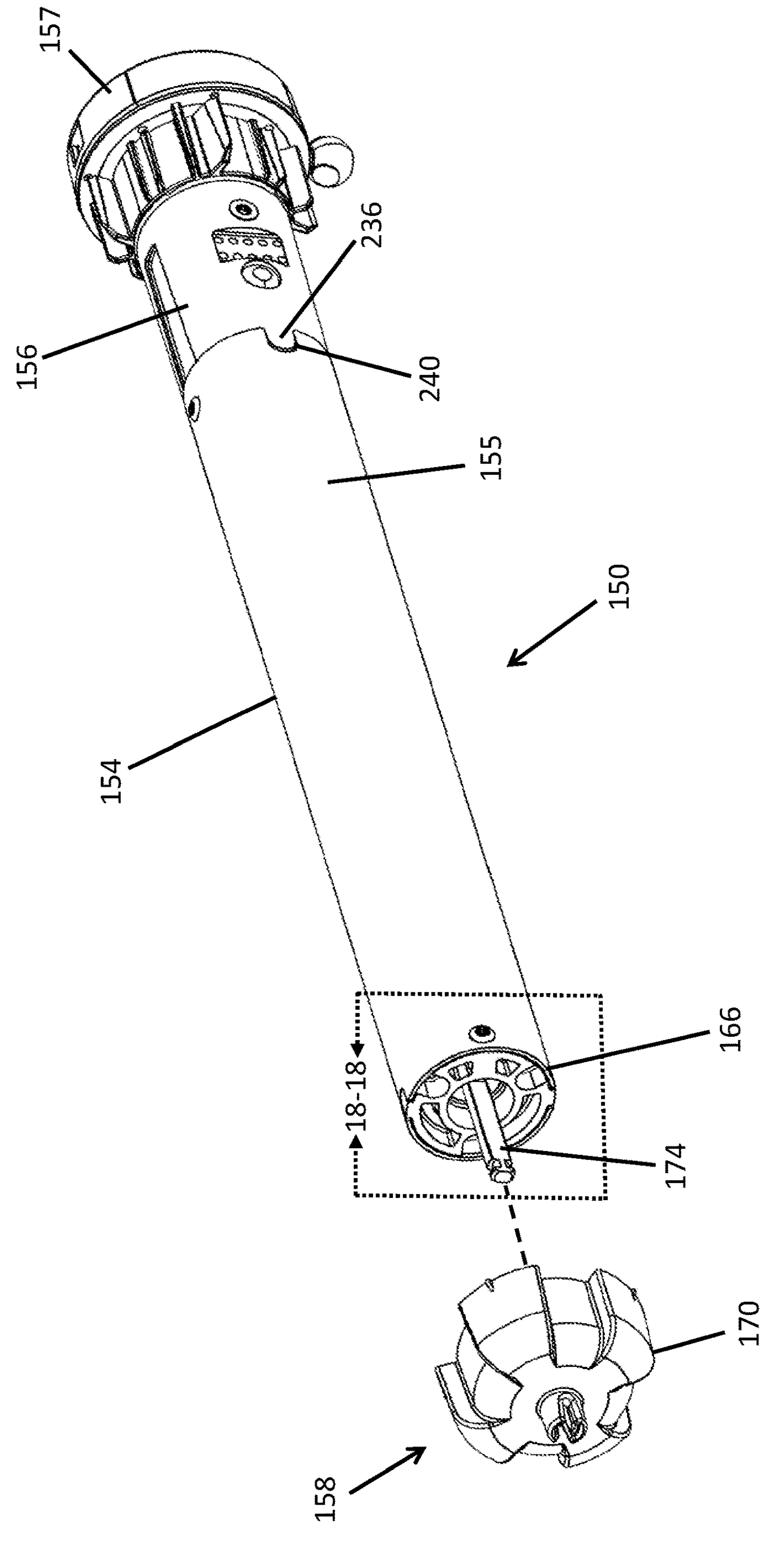
FIG. 10 is a partially exploded view of the motor assembly of FIG. 9 illustrating a roller tube engaging portion disengaged from the motor assembly.

FIG. 10 is a partially exploded view of the motor assembly 150 illustrating the roller tube engaging portion 158 disengaged from the assembly 150. The roller tube engaging portion 158 includes a roller tube drive member 170. The roller tube drive member 170 is configured to slidably engage a drive shaft 174.

Figure 11:
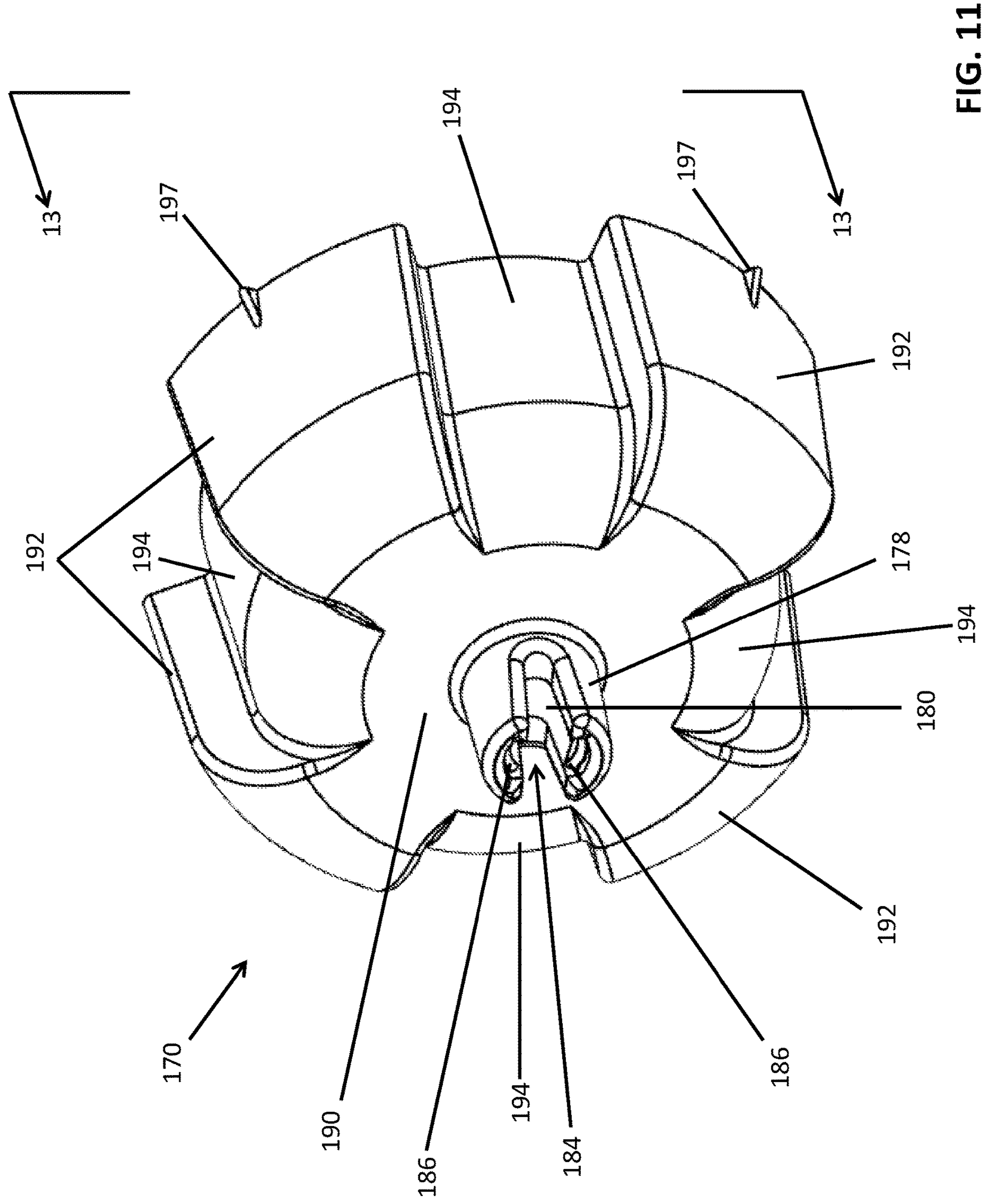
FIG. 11 is a perspective view of a first end of an embodiment of a roller tube drive member for use with the motor assembly of FIG. 10.
Figure 12:
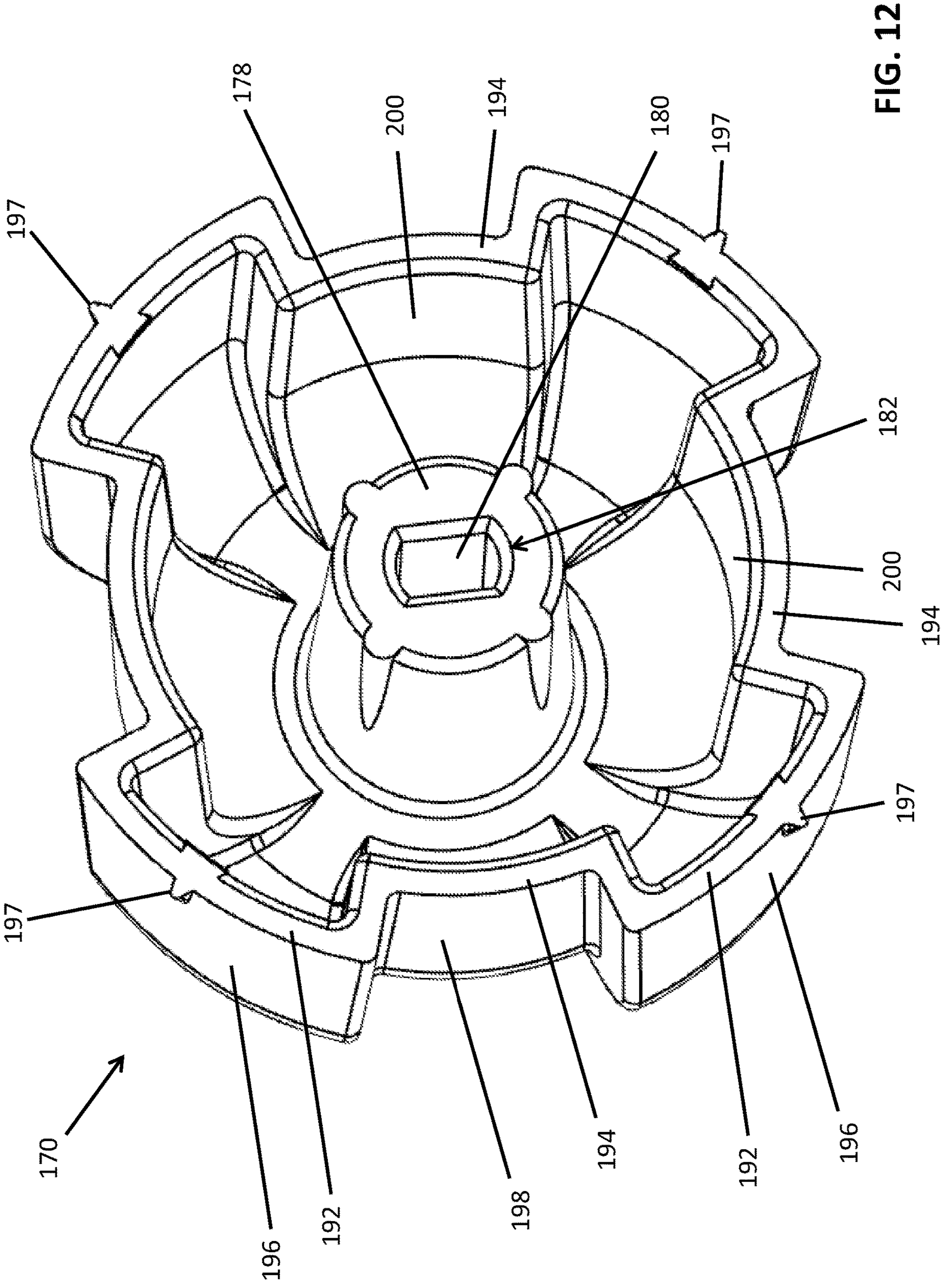
FIG. 12 is a perspective view of a second end, opposite the first end, of the roller tube drive member of FIG. 11.
Figure 13:
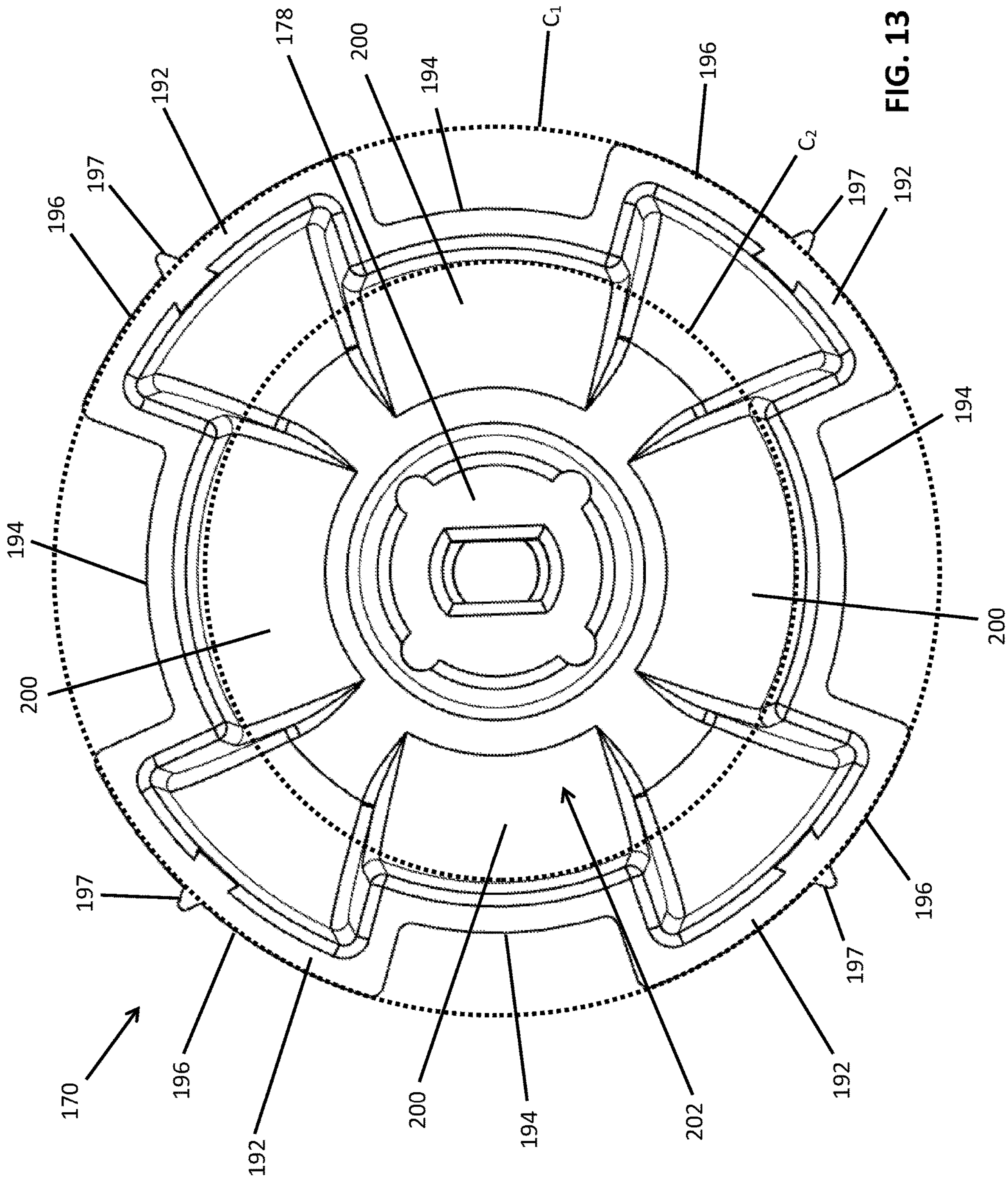
FIG. 13 is an elevation view from the second end of the roller tube drive member of FIG. 11, taken along line 13-13 of FIG. 11.

Referring now to FIGS. 11-13, the roller tube drive member 170 is illustrated in greater detail. With reference to FIGS. 11-12, the roller tube drive member 170 includes a mounting hub 178 that defines an aperture 180 extending through the member 170. The aperture 180 includes a first receiving end 182 (shown in FIG. 12) and a second locking end 184 (shown FIG. 11). The mounting hub 178 defines a plurality of locking teeth 186 positioned at the locking end 184 of the aperture 180 (shown in FIG. 11). The locking teeth 186 are biased towards each other and can engage a corresponding portion of the drive shaft 174 (shown in FIG. 10). In the illustrated embodiment, a pair of locking teeth 186 are positioned on opposing sides of the mounting hub 178. In other embodiments, a single locking tooth 186, or three or more locking teeth 186 can be positioned on the mounting hub 178.

Referring back to FIGS. 11-12, the aperture 180 includes a cross-sectional shape that is keyed to a cross-sectional shape of the drive shaft 174 (shown in FIG. 10). In the illustrated embodiment, the aperture 180 has a generally rectangular cross-sectional shape, and is keyed to receive the drive shaft 174, which also has a generally rectangular cross-sectional shape. In other embodiments, the drive shaft 174 can have any suitable geometric or non-geometric cross-sectional shape (e.g., triangular, square, star, etc.), and the aperture 180 can have a corresponding cross-sectional shape keyed to the drive shaft 174.

The roller tube drive member 170 also includes a body 190 (or housing 190). With reference to FIGS. 11 and 13, the body 190 is defined by a plurality of alternating projections 192 and recesses 194. The projections 192 are offset from the recesses 194. With reference to FIG. 12, each projection 192 includes an outer wall 196, while each recess 194 includes an outer wall 198 and an inner wall 200. The outer wall 198 and the inner wall 200 of each recess 194 is radially closer to the mounting hub 178 than the outer wall 196 of each projection 192. With reference to FIG. 13, the outer walls 196 of the projections 192 define a first circumference $C_1$, shown in broken lines. The inner walls 200 of the recesses 194 define a second circumference $C_2$, also shown in broken lines. The first and second circumferences $C_1$, $C_2$ are concentric relative to the mounting hub 178. The second circumference $C_2$ corresponds to an outer circumference of the motor housing 154. The inner walls 200 also partially define a recess 202 that is configured to receive a portion of the motor housing 154.

As shown in FIGS. 11-13, each projection 192 is spaced from the next, consecutive projection 192 by a recess 194. The recess 194 is a portion of a body of the roller tube drive member 170 that does not radially extend from the mounting hub 178 as far as the outer walls 196 (or roller tube engaging face 196). The projections 192 are each configured to engage an inner surface (or interior circumference) of the roller tube 137. More specifically, the outer walls 196 of each projection 192 is configured to engage the interior circumference of the hollow roller tube 137. In one or more examples of embodiments, each outer wall 196 can include a radial member 197 (or a fin 197). With reference to FIG. 13, each radial member 197 extends radially outward from the outer wall 196 beyond the first circumference $C_1$. Each radial member 197 is configured to engage the interior circumference of the hollow roller tube 137 following receipt of the roller tube drive member 170 by the hollow roller tube 137. While the embodiment roller tube drive member 170 in FIGS. 11-13 illustrate a single radial member 197 positioned on each outer wall 196, in other embodiments each outer wall 196 can include a plurality of radial members 197. For example, in FIG. 14, each outer wall 196 of the roller tube drive member **170*a* includes a plurality of radial members 197, and more specifically two radial members 197. In yet other examples of embodiments, each outer wall 196 of the roller tube drive member 170 can include three or more radial members 197**.

Figure 14:
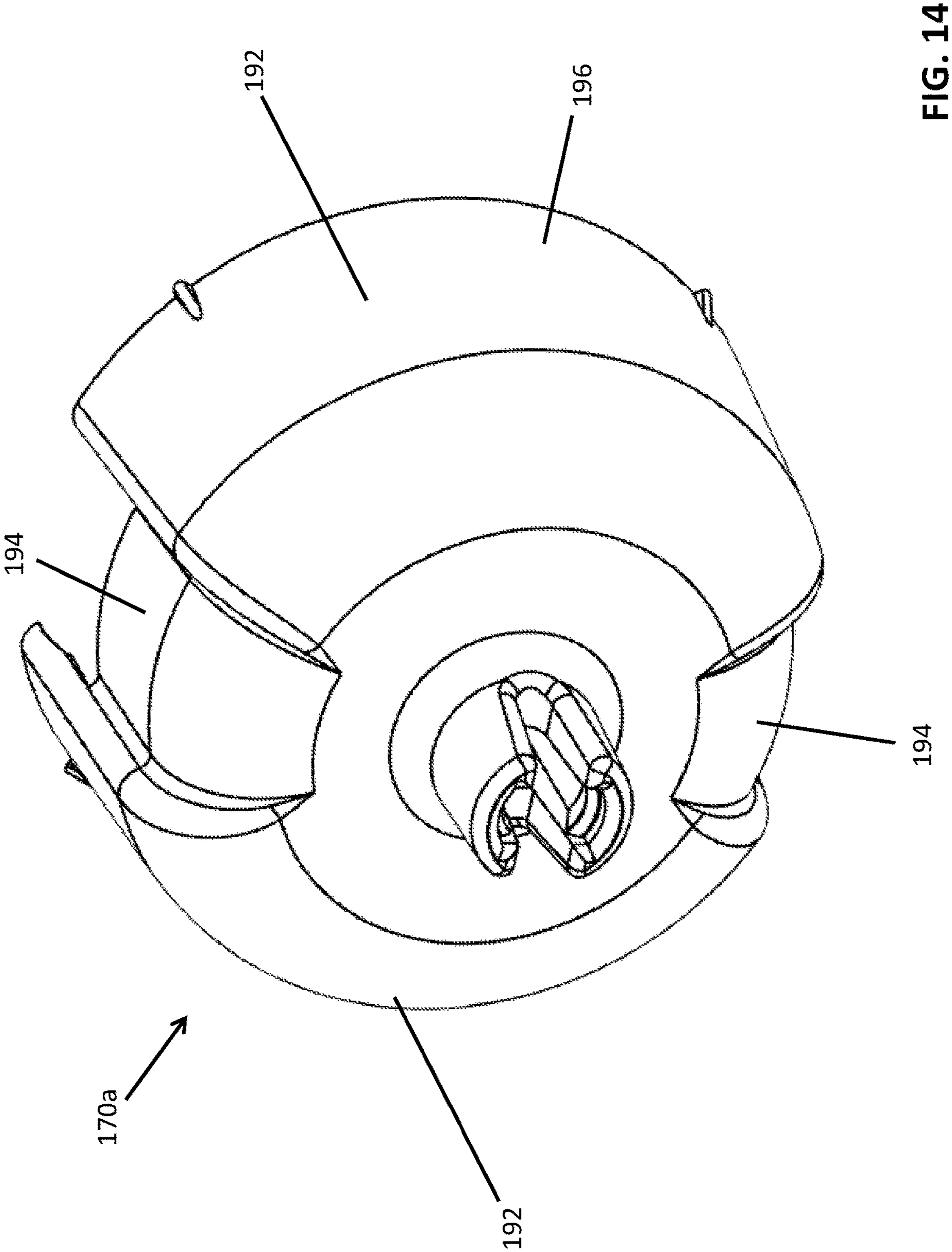
FIG. 14 is a perspective view from a first end of another embodiment of a roller tube drive member for use with the motor assembly of FIG. 10.

In the embodiment of the roller tube drive member 170 illustrated in FIGS. 11-13, the body 190 includes the plurality of projections 192 and the plurality of recesses 194 that extend radially away from the mounting hub 178. More specifically, the roller tube drive member 170 includes four projections 192 spaced around the first circumference $C_1$, and four recesses 194 spaced around the second circumference $C_2$. In other embodiments, the roller tube drive member 170 can have any suitable number of projections 192 and recesses 194. For example, FIG. 14 illustrates another embodiment of a roller tube drive member **170*a*. The roller tube drive member 170*aa* is substantially the same as the roller tube drive member 170, except it includes a pair of projections 192 (or two projections 192), and a pair of recesses 194 (or two recesses 194). In yet other embodiments, the roller tube drive member 170, 170*a* can include three, or five or more projections 192 and/or recesses 194**.

Figure 15:
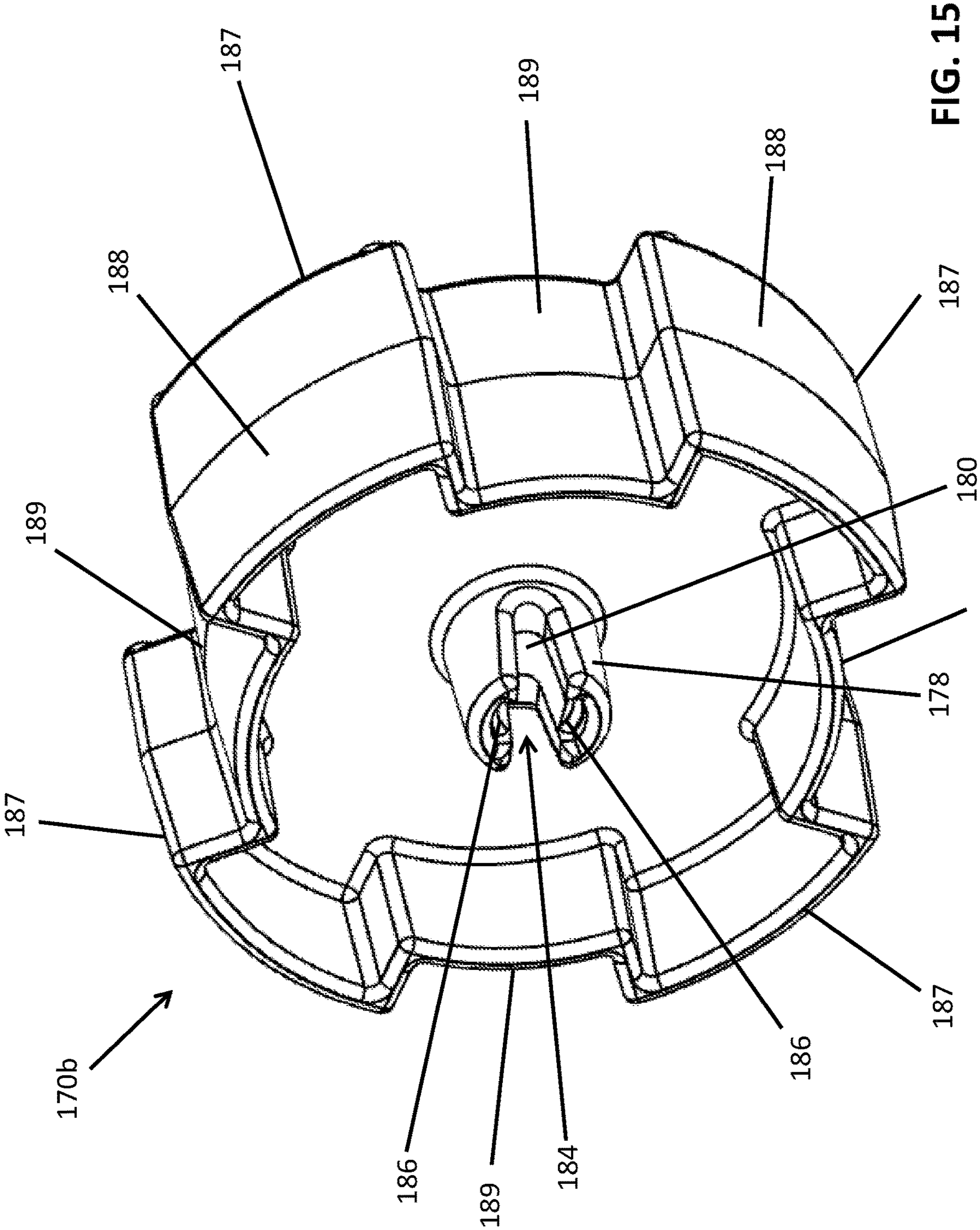
FIG. 15 is a perspective view from a first end of another embodiment of a roller tube drive member for use with the motor assembly of FIG. 10.
Figure 16:
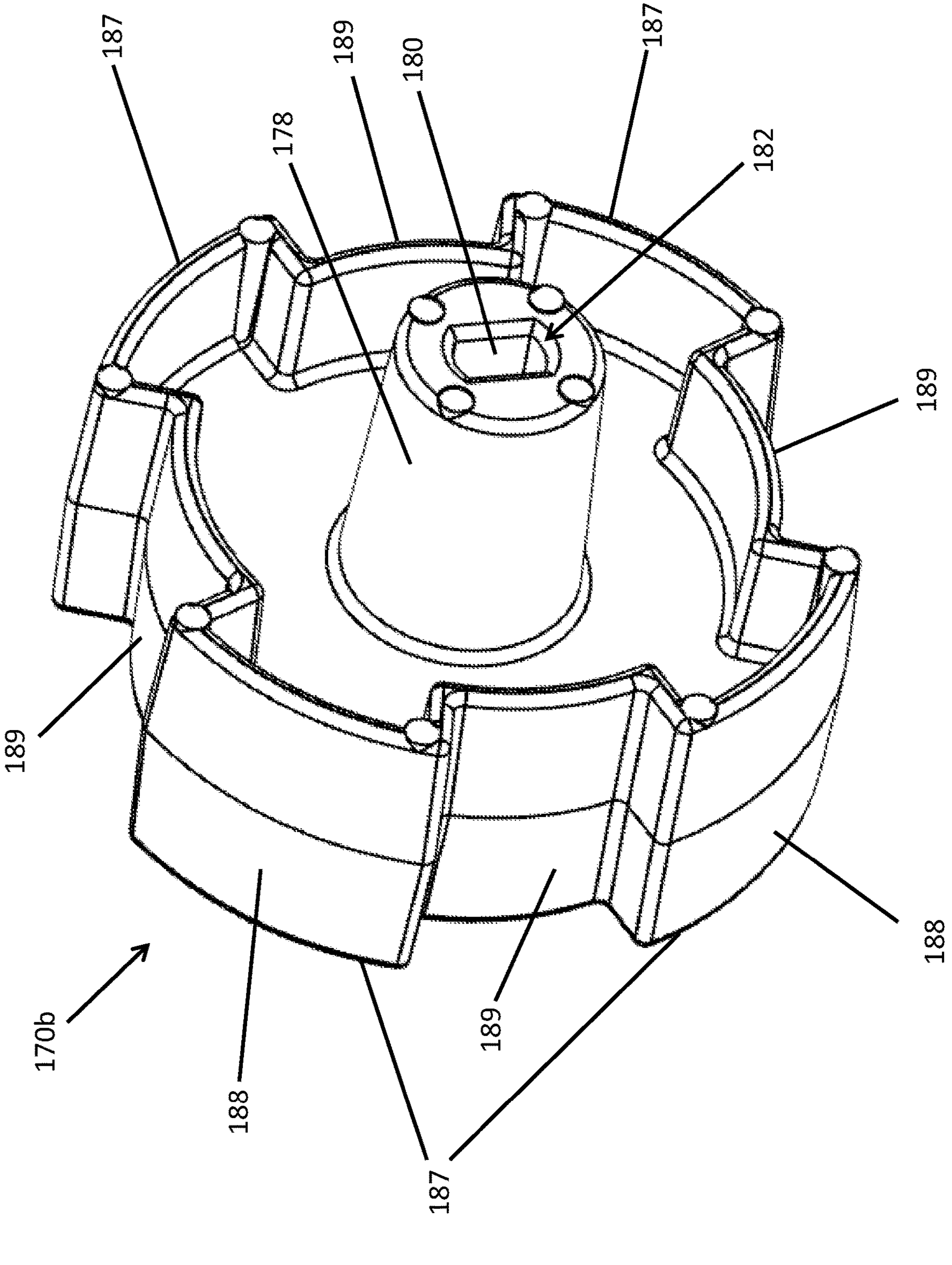
FIG. 16 is a perspective view from a second end, opposite the first end, of the roller tube drive member of FIG. 15.

FIGS. 15-16 illustrate another embodiment of a roller tube drive member **170*b*. It should be appreciated that the roller tube drive member 170*b* includes components similar to the roller tube drive member 170, with like numbers identifying like components. The roller tube drive member 170*b* includes a mounting hub 178 that defines an aperture 180 extending through the member 170. The aperture 180 includes a first receiving end 182 (shown in FIG. 16) and a second locking end 184 (shown FIG. 15). With specific reference to FIG. 15, the mounting hub 178 defines a plurality of locking teeth 186 positioned at the locking end 184 of the aperture 180. The locking teeth 186 are biased towards each other and are configured to engage a corresponding portion of the drive shaft 174. In the illustrated embodiment, a pair of locking teeth 186 are positioned on opposing sides of the mounting hub 178. In other embodiments, a single locking tooth 186, or three or more locking teeth 186 can be positioned on the mounting hub 178. The aperture 180 includes a cross-sectional shape that is keyed to a cross-sectional shape of the drive shaft 174. The functionality and alternatives associated with these common components are the same as that disclosed in association with the roller tube drive member 170**. For the sake of brevity, they are not repeated.

Figure 17:
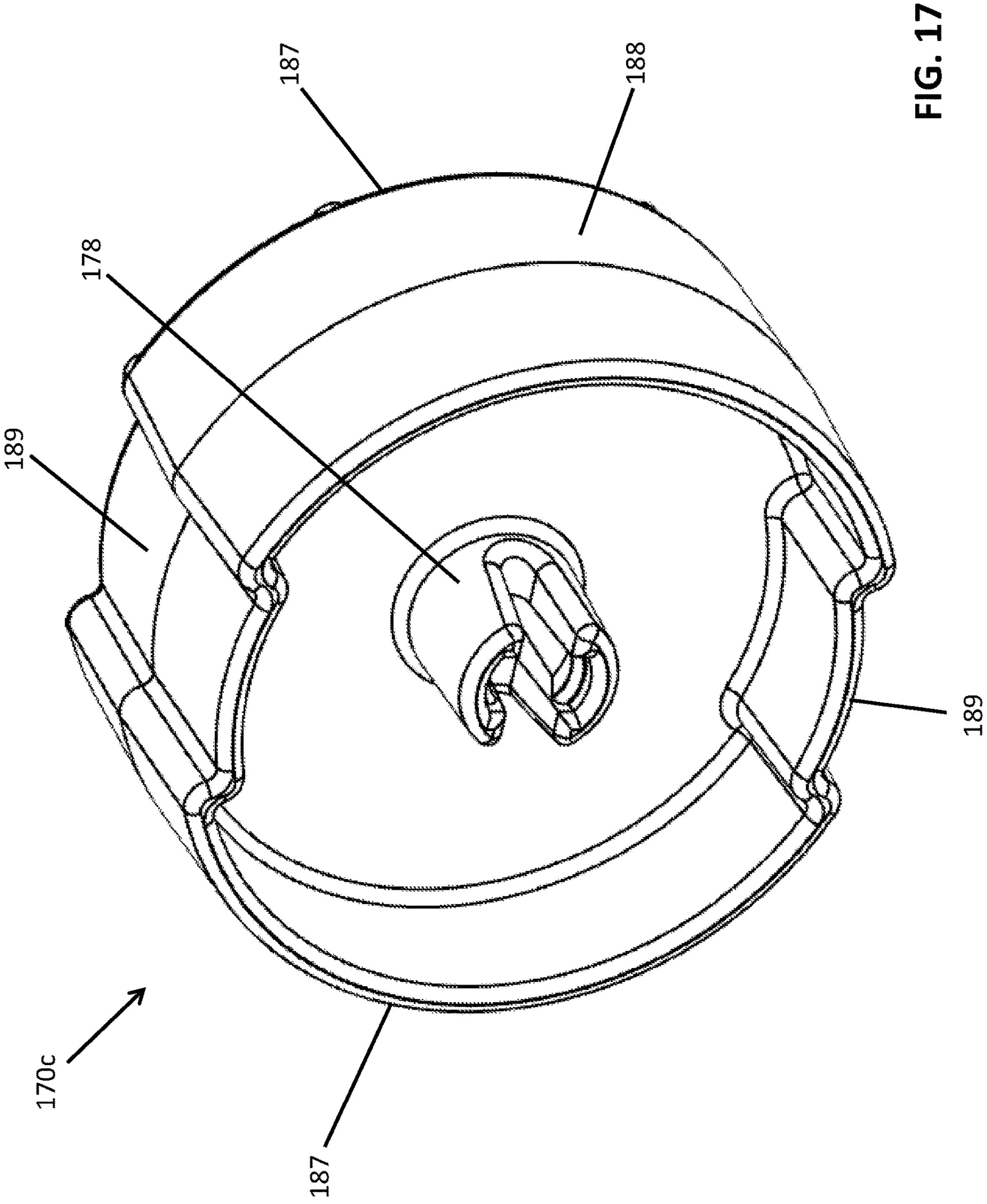
FIG. 17 is a perspective view from a first end of another embodiment of a roller tube drive member for use with the motor assembly of FIG. 10.

The roller tube drive member **170*b* includes a plurality of arms 187 that extend radially away from the mounting hub 178. In the illustrated embodiment, the roller tube drive member 170*b* includes four arms 187 spaced around a circumference of the drive member 170*b*. In other embodiments, the roller tube drive member 170*b* can have any suitable number of arms 187. For example, FIG. 17 illustrates another embodiment of a roller tube drive member 170*c*. The roller tube drive member 170*c* is substantially the same as the roller tube drive member 170*b*, except it includes a pair of arms 187 (or two arms 187). In yet other embodiments, the roller tube drive member 170*b* can include three, or five or more arms 187. Each arm 187 includes a roller tube engaging face 188. Each face 188 defines a portion of an outer circumference of the roller tube drive member 170. As shown in FIGS. 15-17, each arm 187 is spaced from the next, consecutive arm 187 by a recess 189. The recess 189 is a portion of a body of the roller tube drive member 170*b*, 170*c* that does not radially extend from the mounting hub 178 as far as the roller tube engaging face 188. The arms 187 are each configured to engage an inner surface (or interior circumference) of the roller tube 137. More specifically, the roller tube engaging face 188 of each arm 187 is configured to engage the interior circumference of the hollow roller tube 137. It should be appreciated that any one of the roller tube drive members 170, 170*a*, 170*b*, 170*c* can be used in association with the roller tube engaging portion 158**.

Figure 18:
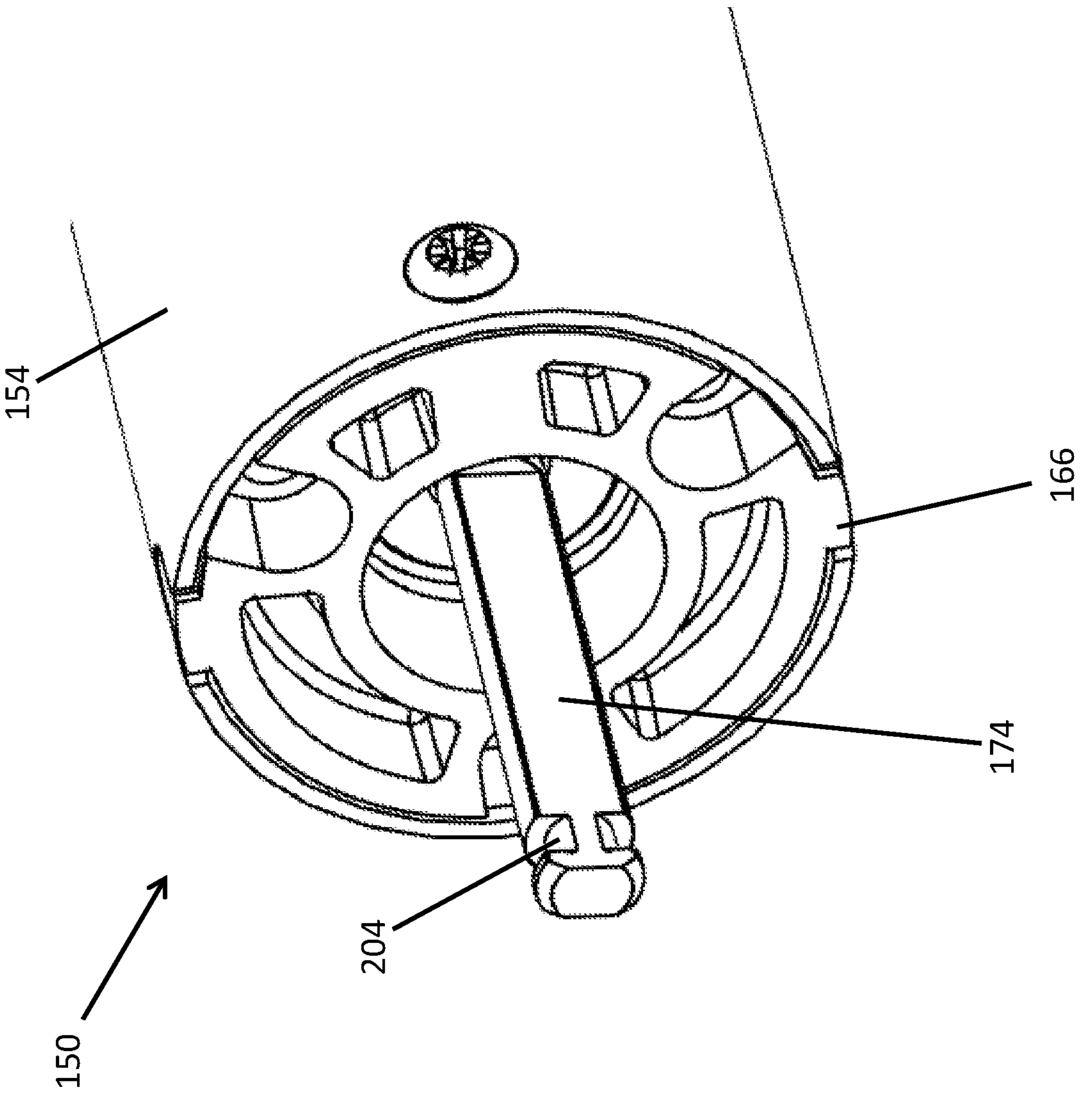
FIG. 18 is a perspective view of a portion of the motor assembly and associated drive shaft, taken along line 18-18 of FIG. 10.

FIG. 18 illustrates a portion of the motor assembly 150, and specifically the first end 166 of the motor housing 154. The drive shaft 174 extends outward from (or projects from) the motor housing 154. The drive shaft 174 includes a notch 204 (or receiving notch 204). The notch 204 is configured to engage the locking teeth 186 of the roller tube drive member 170.

Referring back to FIG. 10, the roller tube engaging portion 158 is configured to slidably engage the first end 166 of the motor housing 154. More specifically, the roller tube drive member 170 slidably engages the drive shaft 174. The drive shaft 174 is received by the aperture 180 in the mounting hub 178 through the first receiving end 182 (see FIG. 15). The drive shaft 174 exits the aperture 180 through the second locking end 184. The shaped drive shaft 174 is accordingly received within the keyed aperture 180. The locking teeth 186 of the mounting hub 178 engage the notch 204 on the drive shaft 174. The locking teeth 186 are biased into engagement with the notch 204. The shaped drive shaft 174 is accordingly received within the keyed aperture 180. The keyed relationship between the drive shaft 174 and the aperture 180, along with the locking teeth 186 of the mounting hub 178 being engaged with the notch 204 on the drive shaft 174, assist with coupling the roller tube drive member 170 to the drive shaft 174. In some embodiments, the roller tube drive member 170, 170*a* also slides along the drive shaft 174 until a portion of the motor housing 154 is received by the roller tube drive member 170, 170*a*. More specifically, a portion of the motor housing 154 is received by the recess 202 partially defined by the inner walls 200 of the recesses 194 within the second circumference $C_2$. Thus, the inner walls 200 are configured to contact a portion of the motor housing 154.

Rotation of the drive shaft 174 results in rotation of the roller tube engaging portion 158. More specifically, as the drive shaft 174 rotates, the roller tube drive member 170 rotates with the drive shaft 174. The keyed relationship between the drive shaft 174 and the apertures 180 of the roller tube drive member 170 assist with transmitting rotational force from the drive shaft 174 to the roller tube drive member 170.

In certain embodiments, the roller tube drive member 170, 170*a* is also configured to reduce the risk of damage to the drive shaft 174 and associated components (e.g., motor, transmission/gear reduction assembly, etc.) caused by an external force. An external force can be any force applied to the motor assembly 150, including but not limited to shipping, installation, or operation. For example, an external force can occur in response to the motor assembly 150 being dropped. The drive shaft 174 in the illustrated embodiment of the motor assembly 150 is cantilevered, and thus exposed from the motor housing 154 and vulnerable to potential damage from an external force. Rather than the drive shaft 174 absorbing the external force, the roller tube drive member 170, 170*a* absorbs and redistributes the external force to more robust (or sturdy) components of the motor assembly 150. When an external force is applied to the motor assembly 150 (e.g., the motor assembly 150 is dropped, etc.), the projections 192 of the body 190 absorb the initial external force (e.g., during an impact, etc.). The external force travels from the projections 192, through the body 190, to the recesses 194. From the recesses 194, the external force is transmitted through the inner walls 200 to the motor housing 154. The motor housing 154 then absorbs and dissipates the external force, reducing the transmission of the external force to the drive shaft 174.

Figure 19:
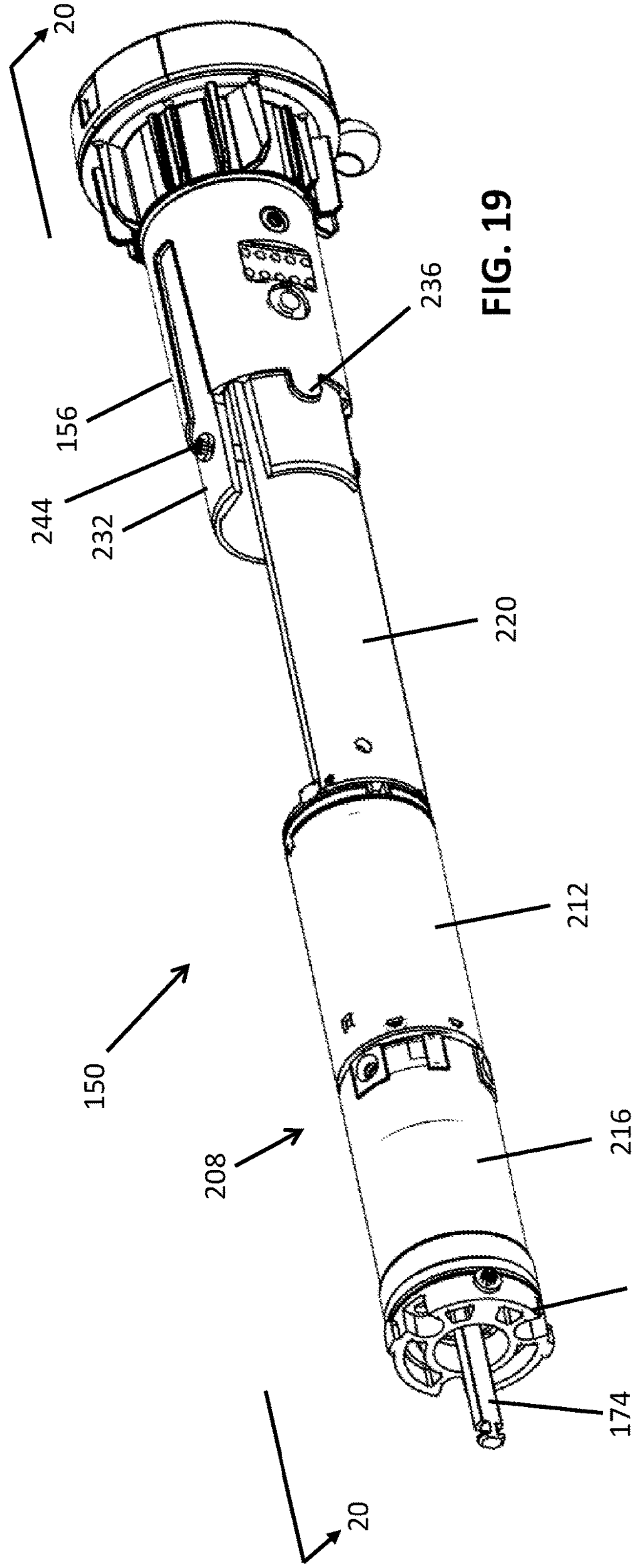
FIG. 19 is a perspective view of the motor assembly of FIG. 9 with a portion of the motor housing and roller tube engaging portion removed to illustrate the components positioned within the motor housing.
Figure 20:
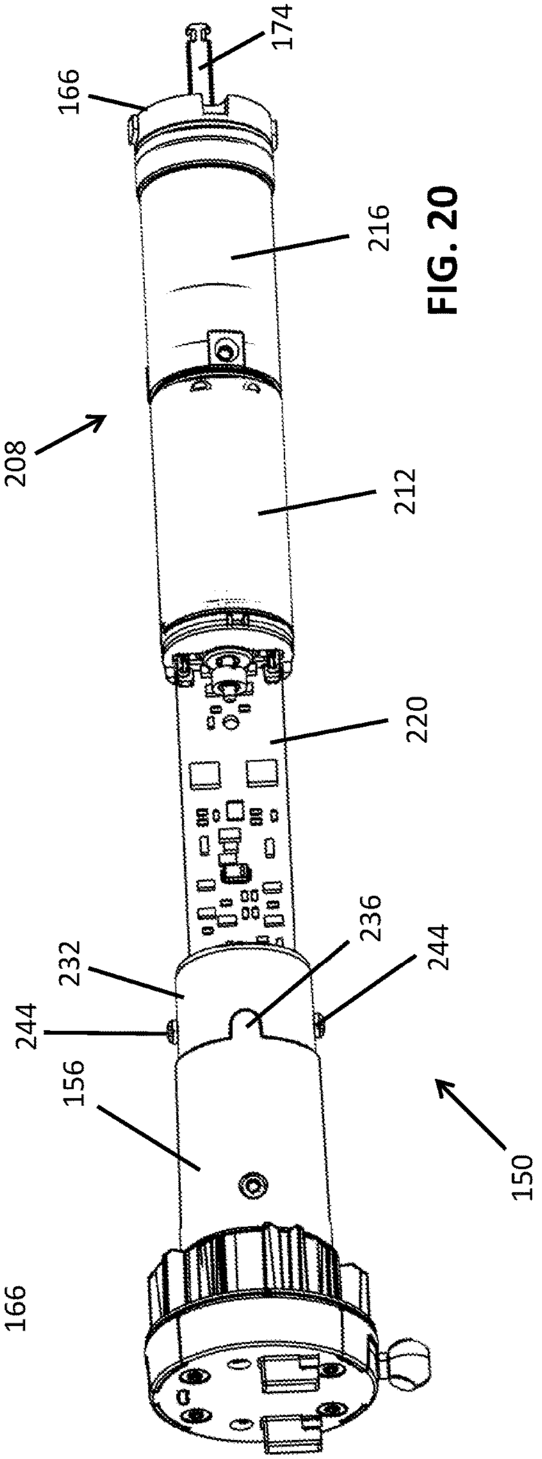
FIG. 20 is a perspective view of the motor assembly of FIG. 19, taken along line 20-20 of FIG. 19.

With reference now to FIGS. 19-20, the motor assembly 150 is illustrated with a portion of the motor housing 154 and the roller tube engaging portion 158 removed to better illustrate components positioned within the motor assembly 150. The components include a motor and drive assembly 208 that is configured to rotate the drive shaft 174. The motor and drive assembly 208 includes a motor 212 operably connected to a gear train 216. The gear train 216 is a speed reducing gear train. In the illustrated embodiment, the gear train 216 is a planetary gear that includes at least one gear reducing stage received within a ring gear. In other embodiments, the gear train 216 can be any suitable gear reduction assembly suitable to reduce a rotational speed generated by the motor 212. The output of the gear train 216 is coupled to the drive shaft 174. In operation, the motor 212 turns a motor shaft (not shown), which is operably connected to the gear train 216. The gear train 216 is operably connected to the drive shaft 174. Thus, as the motor, through the motor shaft, drives the gear train 216, the gear train 216 reduces the rotational speed and rotates the drive shaft 174.

Figure 21:
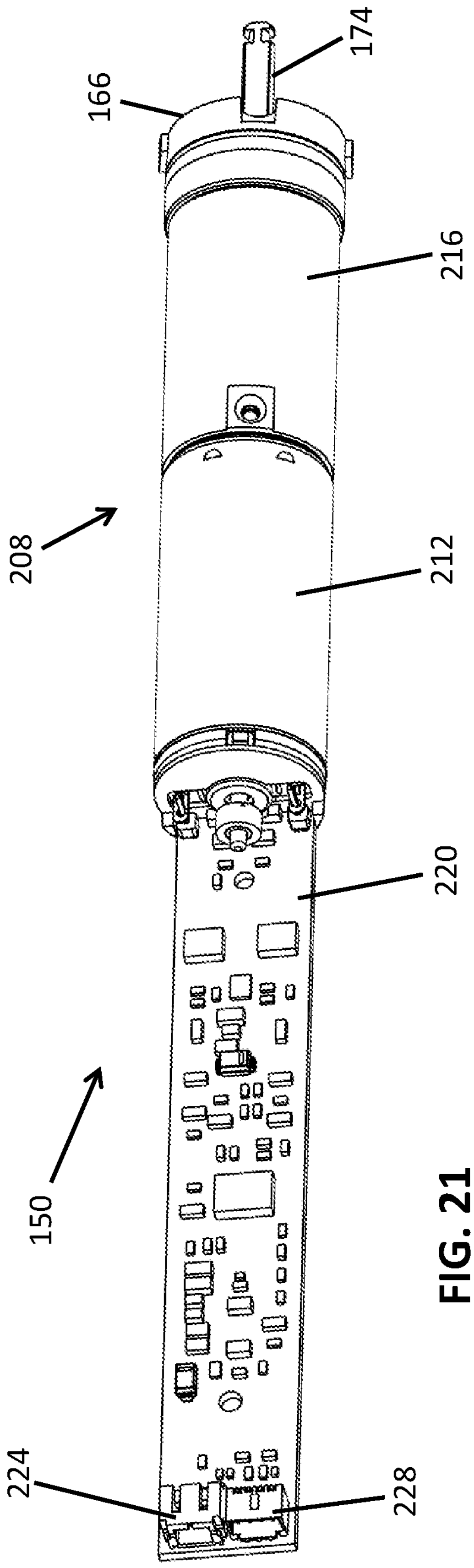
FIG. 21 is a perspective view of the motor assembly of FIG. 20 with the entire motor housing and a mounting housing removed to illustrate the entire printed circuit board.

A printed circuit board 220 (or PCB 220) is operably connected to the motor and drive assembly 208. As shown in FIGS. 19-20, the printed circuit board 220 is coupled to the motor 212. In addition, the printed circuit board 220 extends into the second housing portion 156. The printed circuit board 220 includes one or more components for the operation and control of the motor and drive assembly 208. In addition, and with reference to FIG. 21, the printed circuit board 220 includes a power input 224 and a communication input 228.

With continued reference to FIGS. 19-20, the second housing portion 156 includes a male portion 232. The male portion 232 is configured to be slidably received by the first housing portion 155 motor housing 154 (see FIG. 10). Accordingly, the end of the first housing portion 155 opposite the drive shaft 174 is a female portion configured to receive the male portion 232. To assist with proper alignment of the first housing portion 155 with the second housing portion 156, the second housing portion 156 includes curved members 236 positioned on opposing sides of the second housing portion 156. The curved members 236 are keyed to be received in corresponding curved recesses 240 (shown in FIG. 10) in the first housing portion 155. Once the first housing portion 155 receives the male portion 232 of the second housing portion 156, and the curved members 236 are received by the corresponding curved recesses 240, the first housing portion 155 and the second housing portion 156 can be coupled with at least one fastener 244 (e.g., a screw, a bolt, etc.). In the illustrated embodiment, a pair of fasteners 244 couple the first housing portion 155 and the second housing portion 156.

Figure 22:
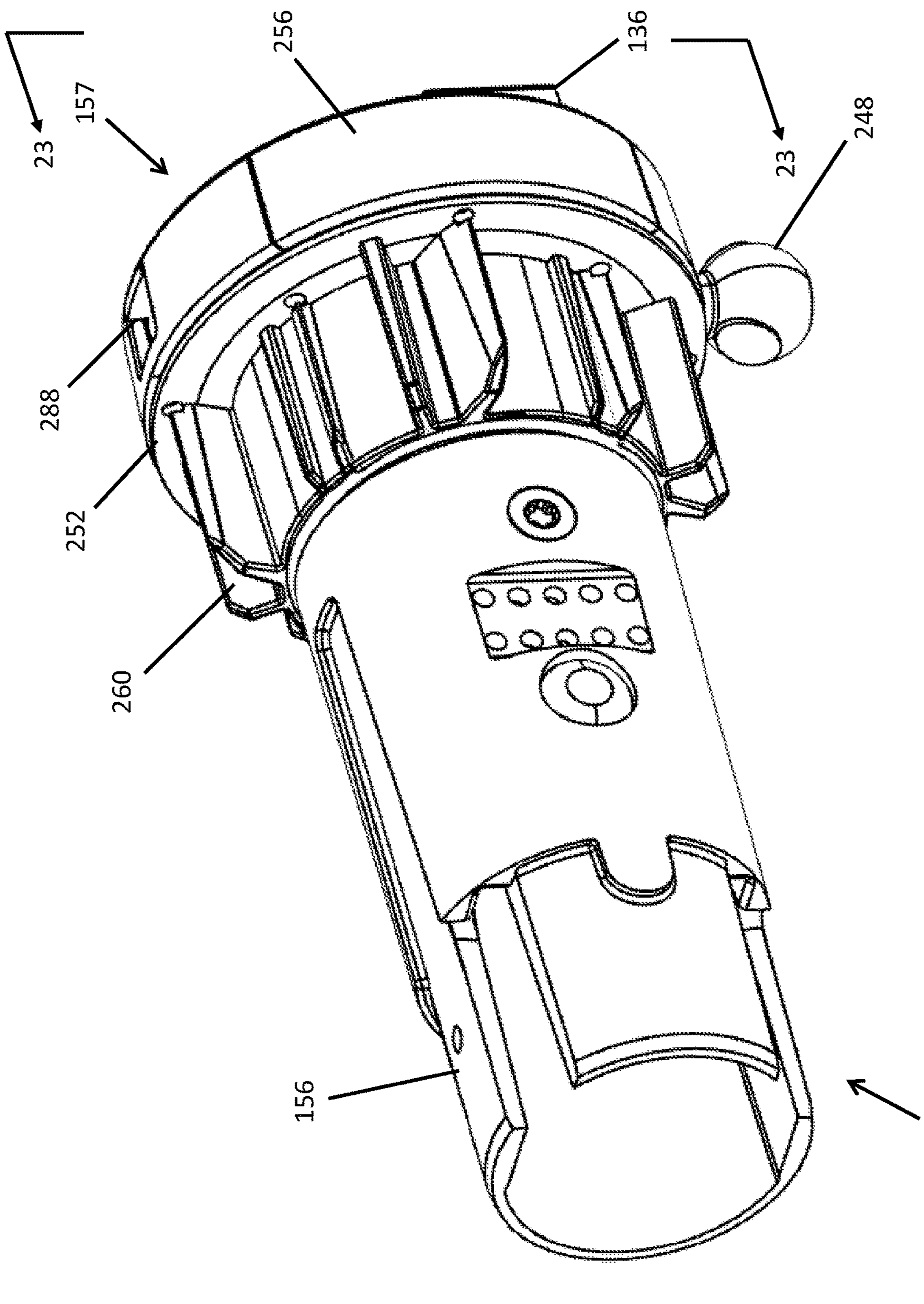
FIG. 22 is a perspective view of a portion of the motor housing and the mounting housing detached from the motor assembly of FIG. 10.
Figure 23:
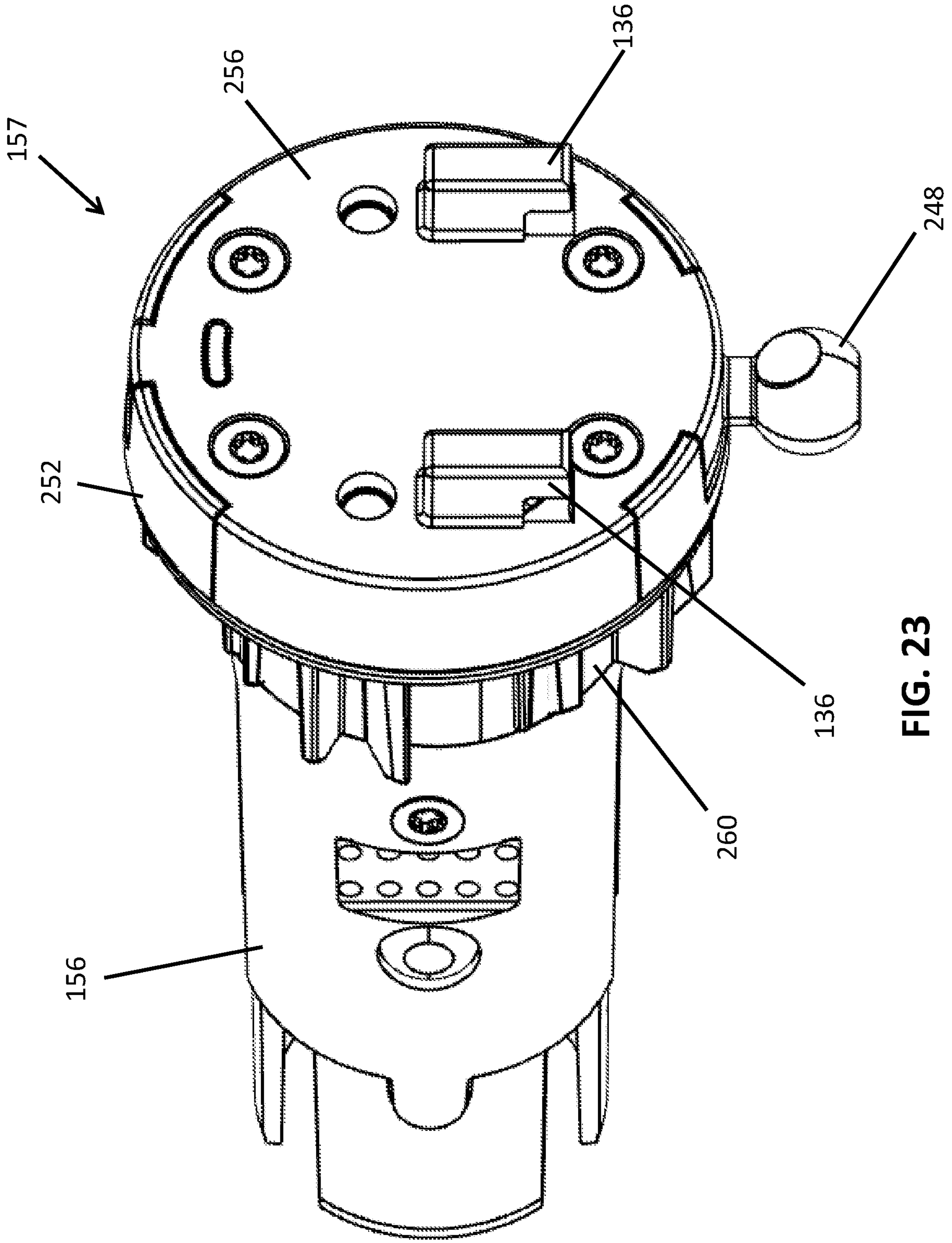
FIG. 23 is a perspective view of the portion of the motor housing and the mounting housing, taken along line 23-23 of FIG. 22.

FIGS. 22-23 further illustrates the mounting housing 157 engaged with the motor housing 154. More specifically, the mounting housing 157 is illustrated as engaged with the second housing portion 156. The mounting housing 157 includes the hook members 136 and a ball joint 248.

With reference to FIGS. 22-25, the mounting housing 157 is defined by a head member 252, an end cap 256, and a crown member 260. With specific reference to FIGS. 24-25, the head member 252 defines a substantially hollow interior passage 264 that extends entirely through the head member 252. A first end 268 of the head member 252 is configured to engage the second end 168 of the motor housing 154. A second end 272 of the head member 252, opposite the first end 268, is configured to engage the end cap 256.

Figure 24:
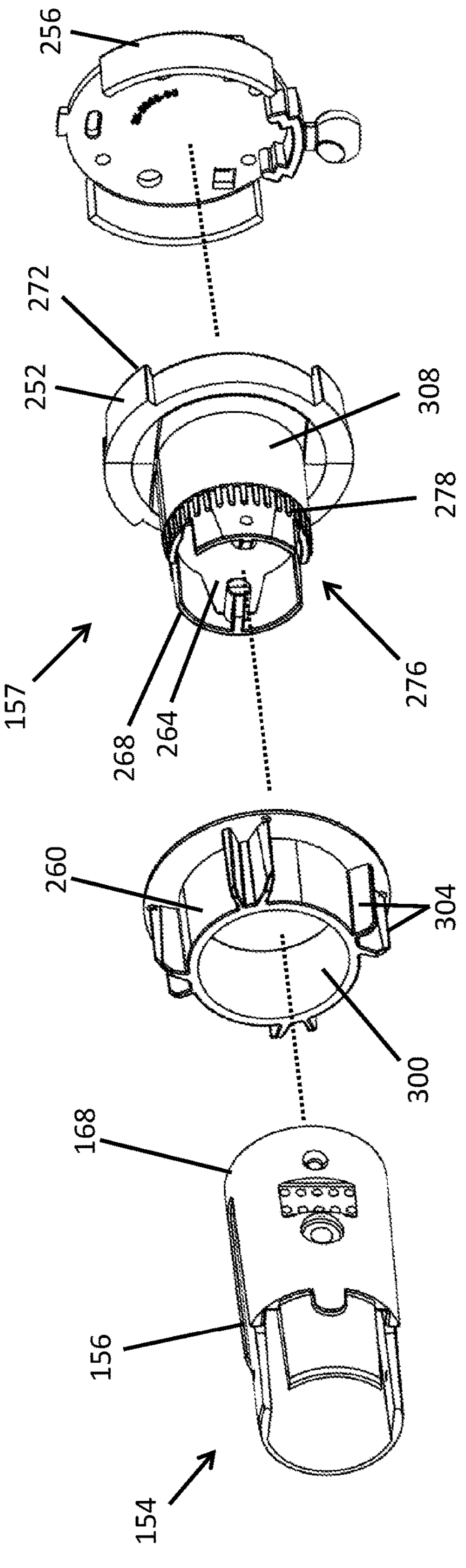
FIG. 24 is an exploded view of the portion of the motor housing and the mounting housing of FIG. 22.
Figure 25:
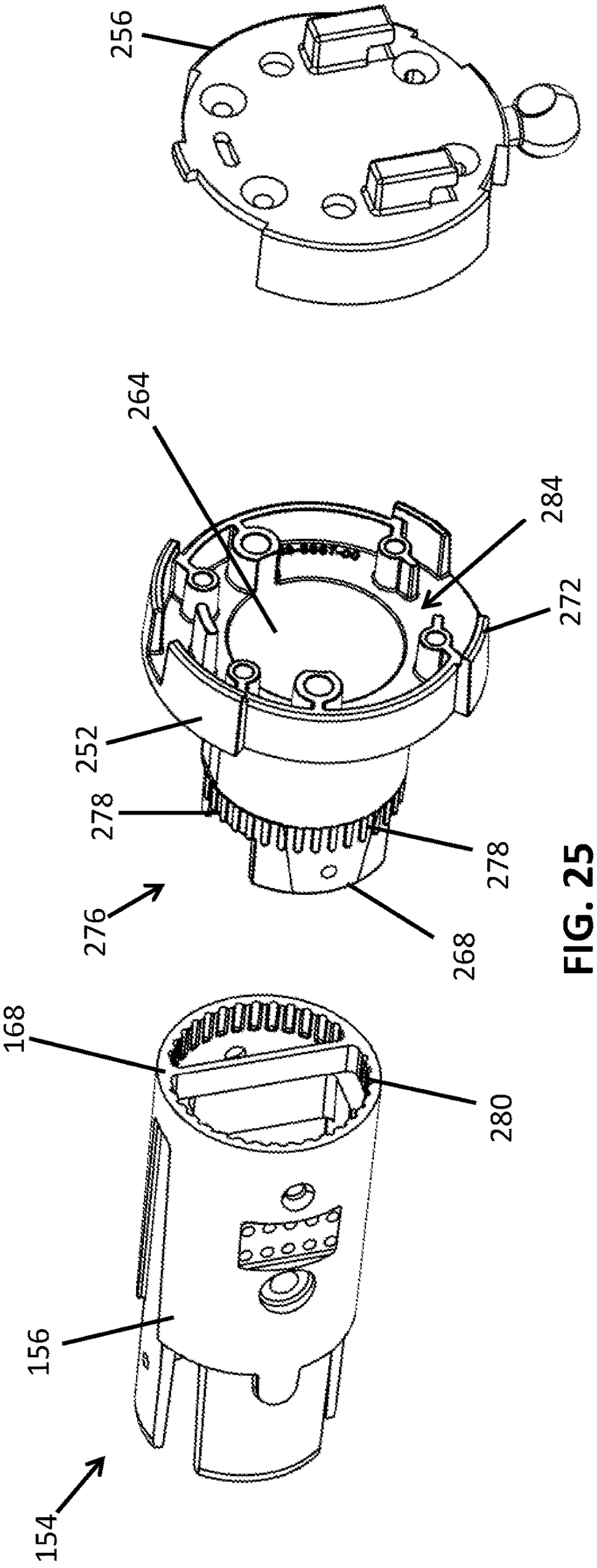
FIG. 25 is an exploded view of the portion of the motor housing and the mounting housing of FIG. 23, with the crown member removed for clarity.

With continued reference to FIGS. 24-25, the head member 252 is configured to engage the second end 168 of the motor housing 154 by an anti-rotation connection 276. The connection 276 is defined by a plurality of teeth 278 and a plurality of recesses 280 that interlock. The teeth 278 are positioned parallel to each other around an outer circumference of the head member 252. Each tooth 278 is configured to be received by a corresponding recess 280 defined in the second end 168 of the motor housing 154, and more specifically in an end of the second housing portion 156. Each recess 280 is positioned parallel to each other around an inner circumference of the second housing portion 156 (shown in FIG. 25). When engaged, the second housing portion 156 and the head member 252 slide into engagement, where the teeth 278 and recesses 280 interlock. The interlocking interface restricts rotation of the head member 252 (and the mounting housing 157) relative to the second housing portion 156 (and the motor housing 154). Stated another way, the anti-rotation connection 276 restricts rotation of the motor housing 154 relative to the mounting housing 157, and more specifically restricts rotation of the second housing portion 156 relative to the head member 252.

The second end 272 of the head member 252, opposite the first end 268, is configured to engage the end cap 256. More specifically, the end cap 256 is configured to fasten to the head member 252 by a plurality of fasteners (e.g., screw, bolt, etc.). When fastened, the head member 252 and the end cap 256 define an interior gap 284 (or an interior space 284) (see FIG. 25). In addition, the head member 252 and the end cap 256 define an exit opening 288 (see FIG. 22). The exit opening 288 is in communication with the interior gap 284, and the interior gap 284 is in communication with the interior passage 264. Together they provide a path from the printed circuit board 220 out of the mounting housing 157.

Figure 26:
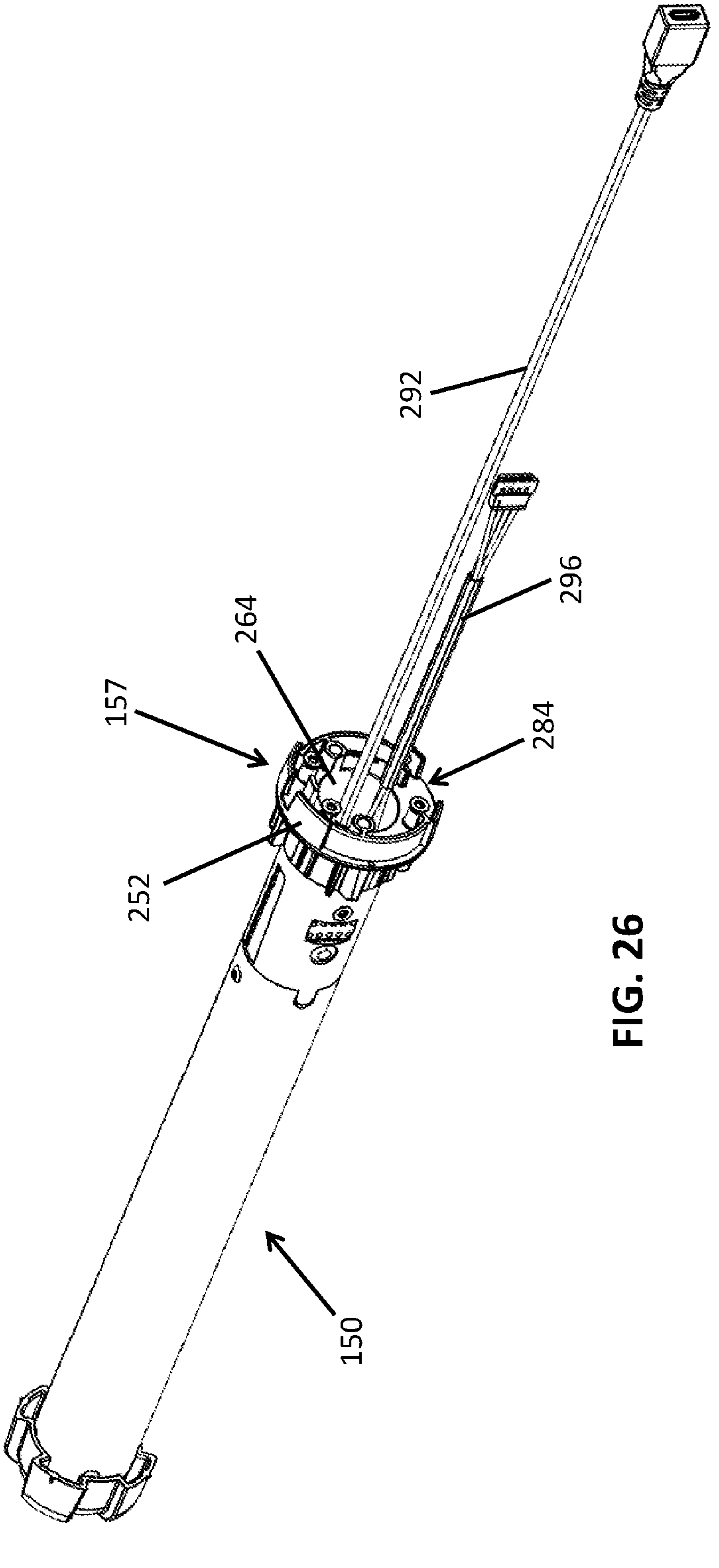
FIG. 26 is a perspective view of the motor assembly of FIG. 8 with the end cap removed to illustrate the wire harnesses.

FIG. 26 illustrates the motor assembly 150 with the end cap 256 removed. A first, power wire harness 292 and a second, communication wire harness 296 extend from the printed circuit board 220 out of the head member 252 of the mounting housing 157. One end of the power wire harness 292 selectively engages the power input 224 of the printed circuit board 220 (see FIG. 21). Similarly, one end of the communication wire harness 296 selectively engages the communication input 228 of the printed circuit board 220 (see FIG. 21). The wire harnesses 292, 296 then extend from the printed circuit board 220, through the interior passage 264 of the head member 252, and into the interior gap 284. When the end cap 256 is fastened to the head member 252, the wire harnesses 292, 296 exit the interior gap 284 through the exit opening 288 (see FIG. 22). The wire harnesses 292, 296 then extend around a portion of the head member 252 (see FIG. 4). The end of the power wire harness 292 opposite the power input 224 engaging end is configured to selectively engage a power source (not shown). The power source can be a rechargeable battery, a replaceable/disposable battery, a domestic electrical outlet, or any other suitable power source for electrically powering the motor assembly 150 to facilitate operational functionality as disclosed herein.

With reference back to FIGS. 22-24, the crown member 260 is configured to rotate on a portion of the head member 252. With specific reference to FIG. 24, the crown member 260 includes an internal aperture 300 and a plurality of arms 304. The internal aperture 300 extends entirely through the crown member 260. The arms 304 extend radially away from the internal aperture 300. The crown member 260 is configured to receive a portion of the head member 252. The first end 268 of the head member 252 is inserted into the internal aperture 300 of the crown member 260. The crown member 260 then slides along a body of the head member 252 into engagement with a support surface 308. The crown member 260 is configured to engage an internal circumference of the roller tube 137, and then rotate relative to the head member 252 along the support surface 308.

Figure 27:
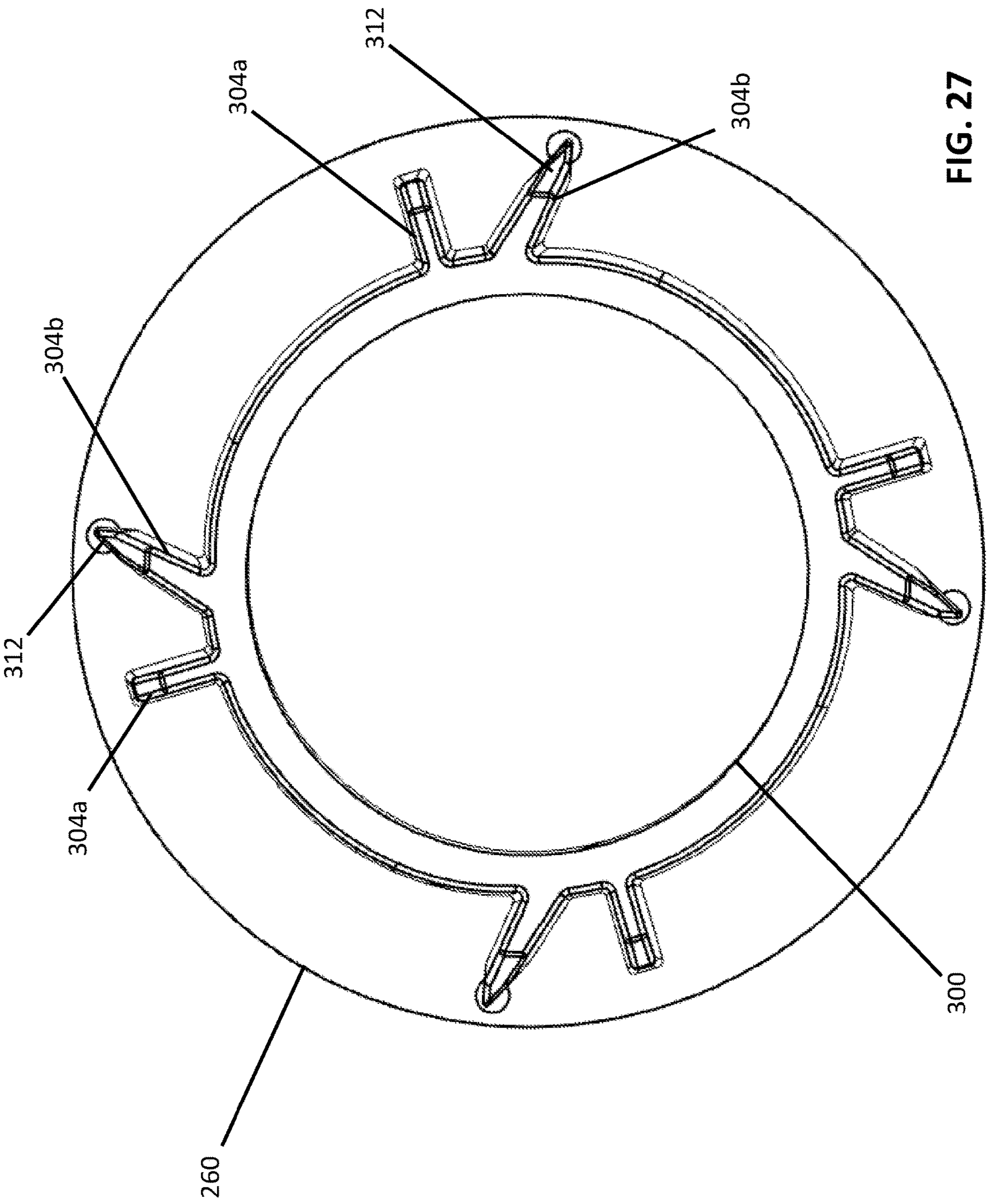
FIG. 27 is an elevation view of the crown member associated with the mounting housing of FIG. 22.
Figure 30:
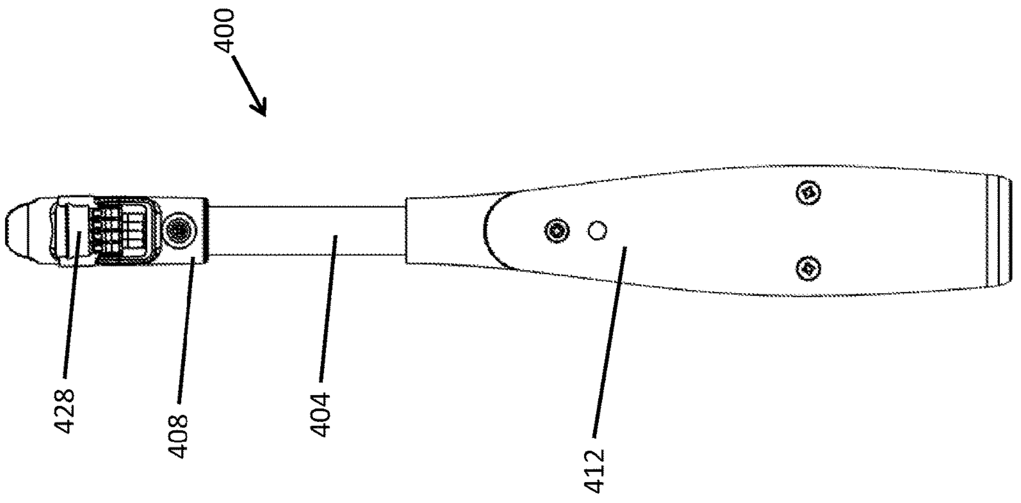
FIG. 30 is an elevation view of a second side of the wand assembly of FIG. 28, opposite the first side.
Figure 29:
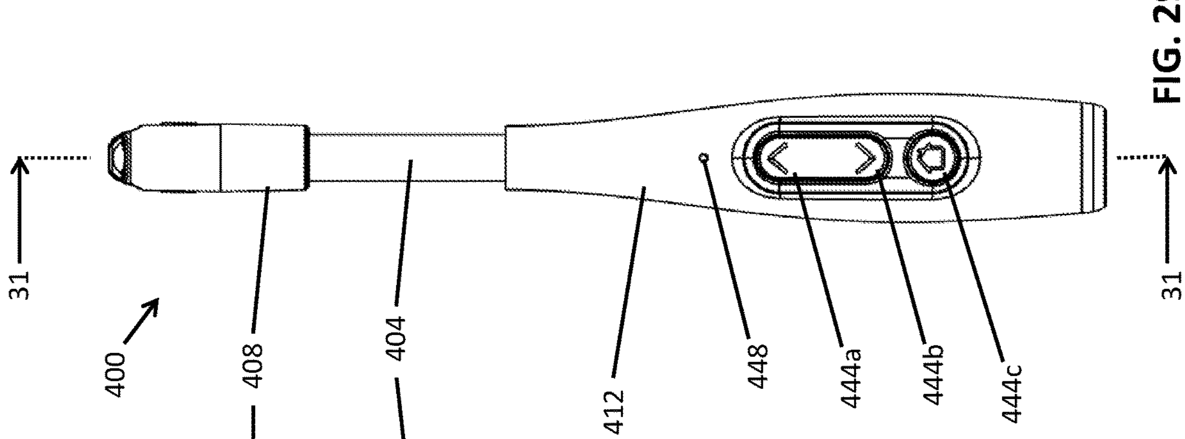
FIG. 29 is an elevation view of a first side of the wand assembly of FIG. 28.
Figure 28:
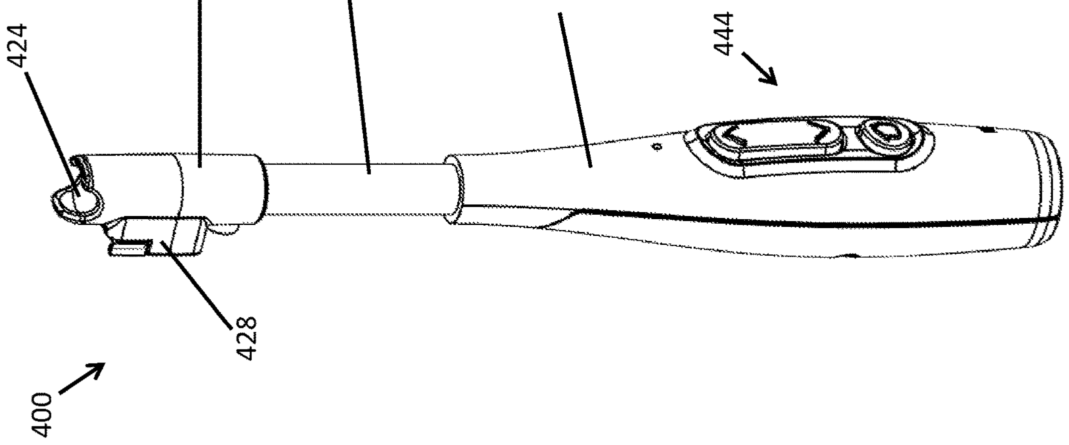
FIG. 28 is a perspective view of a wand assembly for use with the motorized roller shade assembly of FIG. 1.
Figure 31:
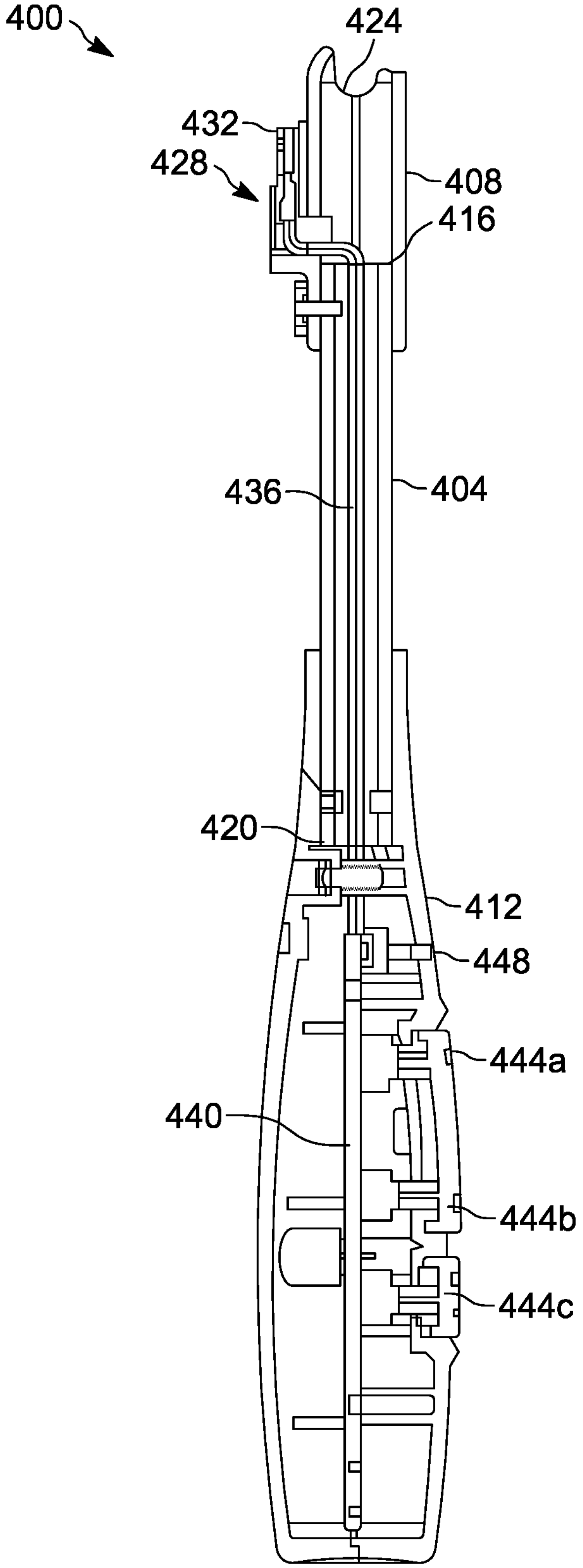
FIG. 31 is a cross-sectional view of the wand assembly of FIG. 28, taken along lines 31-31 of FIG. 29.

To facilitate engagement with the roller tube 137, the crown member includes the plurality of arms 304. With reference to FIG. 27, the arms 304 can include a first set of arms 304*a* that project radially from the internal aperture 300. The arms can also include a second set of arms 304*b* that are oriented at an oblique angle to the internal aperture 300. The second set of arms 304*b* can include an end 312. The end 312 can form a tip and be biased toward engagement with the internal circumference (or inner surface) of the roller tube 137. The crown member 260 is configured to rotate relative to the head member 252 in response to rotation of the roller tube 137 that is driven by the roller tube engaging portion 158 and the associated motor and drive assembly 208.

In the embodiment illustrated in FIGS. 22-23, the mounting housing 157 includes the hook members 136 and the ball joint 248. More specifically, the hook members 136 and the ball joint 248 are formed in the end cap 256. In other embodiments, the ball joint 248 can be coupled to the end cap 256, to the head member 252, or to any other suitable portion of the mounting housing 157. Similarly, the hook members 136 can be coupled to the end cap 256, to the head member 252, or to any other suitable portion of the mounting housing 157.

FIGS. 28-31 illustrate an embodiment of the wand assembly 400 (or control wand 400 or control assembly 400). The wand assembly 400 includes a wand housing 404, a socket housing 408, and a control housing 412. With specific reference to FIG. 31, the wand housing 404 is a hollow (or substantially hollow) housing the includes a first end 416 opposite a second end 420. The socket housing 408 is coupled to the first end 416 of the wand housing 404, while the control housing 412 is coupled to the second end 420 of the wand housing 404.

The socket housing 408 defines a socket 424. The socket 424 is configured to engage (or receive) the ball joint 248 to form a ball and socket connection between the wand assembly 400 and the mounting housing 157. The socket housing 408 also defines a port assembly 428. The port assembly 428 is configured to engage an end of the communication wire harness 296 to facilitate communications between the wand assembly 400 and the motor assembly 150. While the illustrated embodiment depicts the ball joint 248 as coupled to (or defined by) a portion of the motor assembly 150 and the socket 424 as coupled to (or defined by) a portion of the wand assembly 400, in other embodiments the components can be reversed. For example, the ball joint 248 can by coupled to (or defined by) a portion of the wand assembly 400, while the socket 424 can by coupled to (or defined by) a portion of the motor assembly 150.

An end of the communication wire harness 296 is configured to plug into a port 432 of the port assembly 428 (e.g., by a port end in the communication wire harness 296). The communication wire harness 296 can be selectively engaged with the port assembly 428. More specifically, the communication wire harness 296 can be plugged into (or placed into engagement with) or unplugged from (or removed from engagement with) the port assembly 428. An internal communication cord 436 is connected at one end to the port 432, and at a second, opposite end, to a controller 440 in the control housing 412.

The port assembly 428 is positioned between the socket 424 and the wand housing 404. Accordingly, a first portion of a communication cord (i.e., a portion of the communication wire harness 296) that extends from the mounting housing 157 of the motor assembly 150 into removable communication with the port assembly 428 is exposed. Stated another way, the first portion of the communication cord (i.e., the portion of the communication wire harness 296) couples to the wand assembly 400 between the socket 424 and the wand housing 404. A second portion of the communication cord (i.e., the communication cord 436) that extends from the port assembly 428 to the controller 440 is contained (or enclosed) within the wand assembly 400.

The controller 440 is a printed circuit board 440 (or PCB 440). In other embodiments, the controller 440 can be any suitable user-initiated control that accepts an input command and communicated the command to the motor assembly 150. With specific reference to FIGS. 28, 29, and 31, the controller 440 includes a plurality of control inputs 444 (or input buttons 444 or buttons 444). The controller 440 can include a first control input 444*a* (or up button 444*a*), a second control input 444*b* (or down button 444*b*), and a third control input 444*c* (or home button 444*c*). In other embodiments, the controller 440 can have a single control input 444, a pair of control inputs 444, or four or more control inputs 444. The controller 440 can also include a light emitting diode 448 (or illuminating component 448 or light 448 or LED 448). The light emitting diode 448 can illuminate in response to a user interacting (or depressing) one or more or the control inputs 444.

In operation, a user can interact (depress) the first control input 444*a*, which will send a command to the motor assembly 150 to raise the covering material relative to the architectural opening. The user can interact (depress) the second control input 444*b*, which will send a command to the motor assembly 150 to lower the covering material relative to the architectural opening. The user can interact (depress) the third control input 444*c*, which will send a command to the motor assembly 150 to move the covering material to a home position relative to the architectural opening. The home position can be a preprogrammed (or programmable) position of the covering material relative to the architectural opening. When depressing any of the control inputs 444, the light emitting diode 448 can illuminate to provide a user visual feedback of the initiated command.

Figure 32:
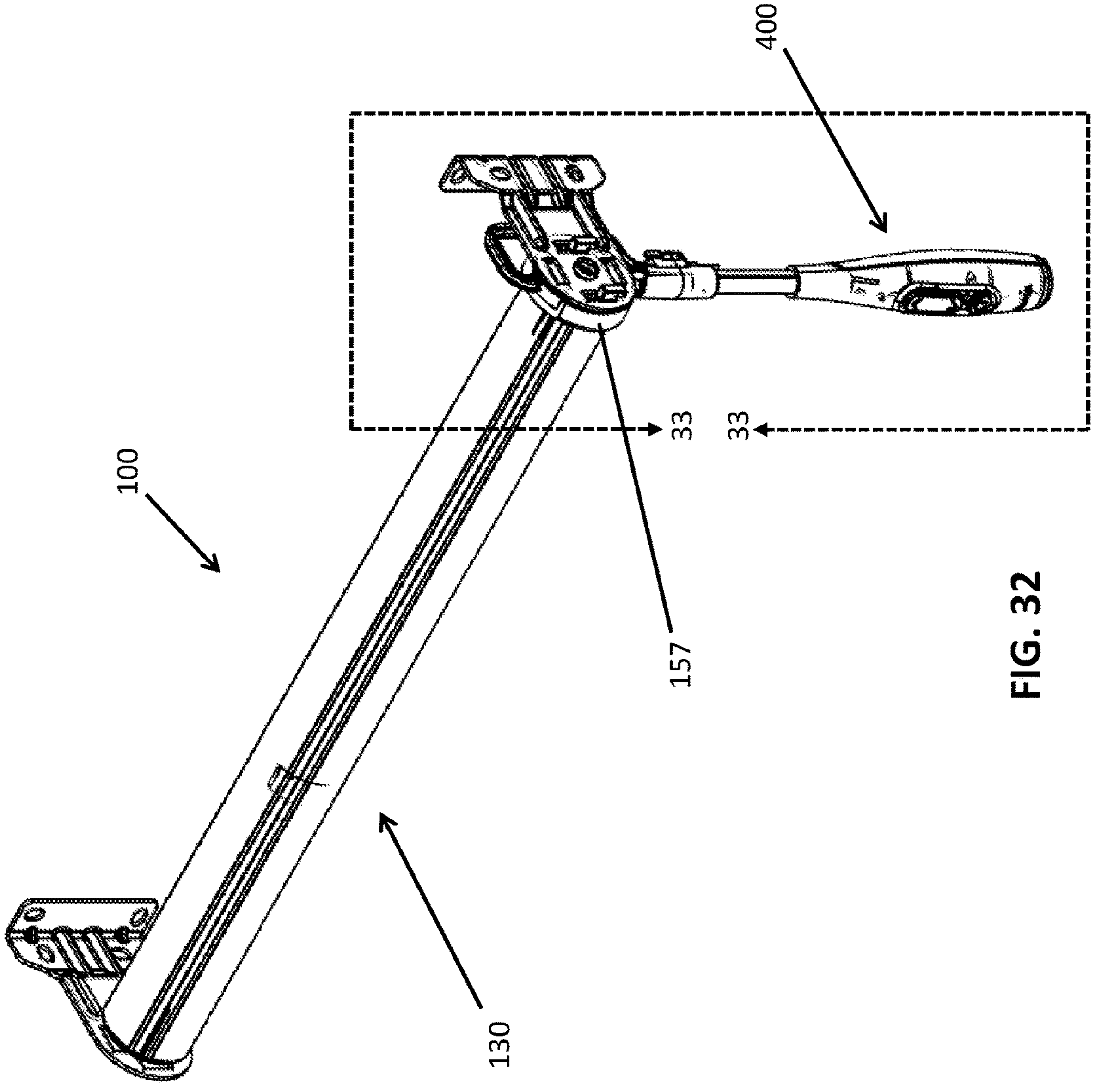
FIG. 32 is a perspective view of the motorized roller shade assembly of FIG. 2 illustrating the wand assembly in an attached configuration.
Figure 33:
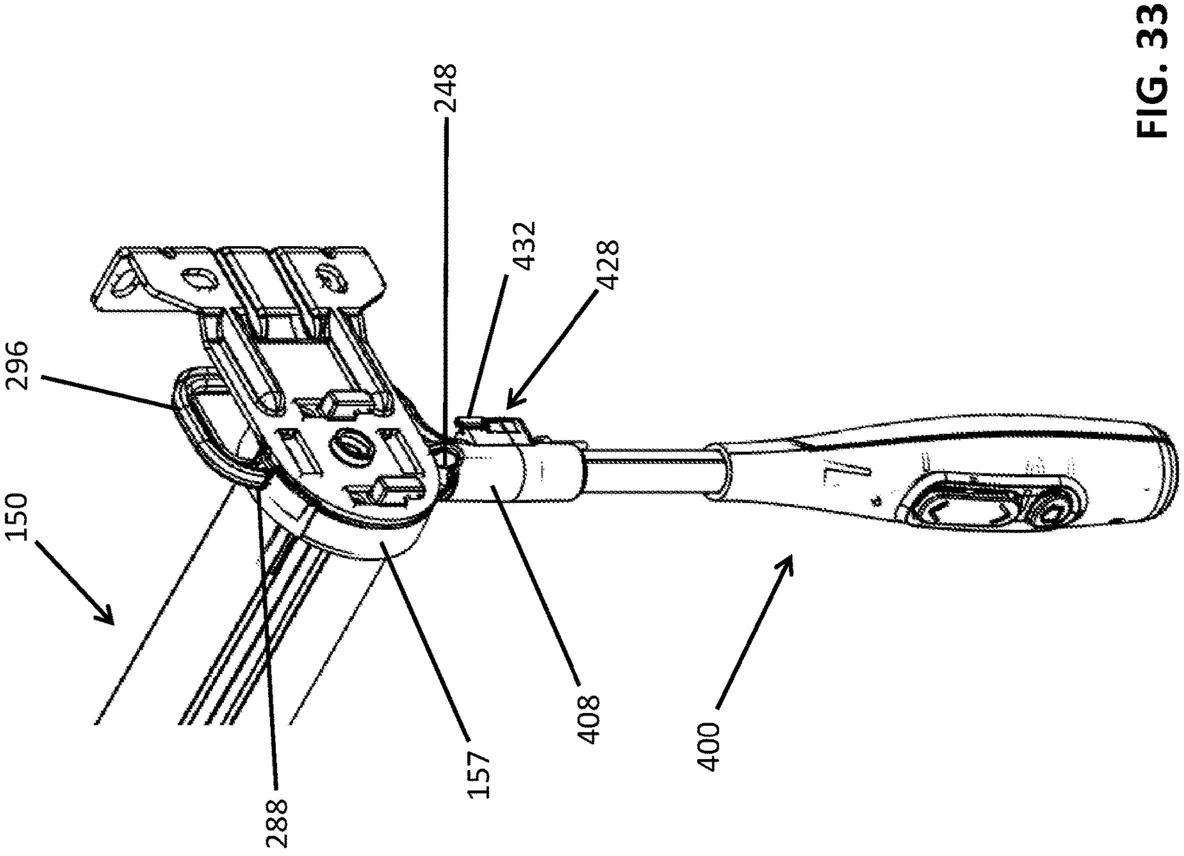
FIG. 33 is a close-up view of the wand assembly attached to the motorized roller shade assembly of FIG. 2, taken along lines 33-33 of FIG. 32.

With reference now to FIGS. 32-33, the wand assembly 400 is illustrated connected to the motor assembly 150. More specifically, the wand assembly 400 is shown removably coupled to the mounting housing 157 of the motor assembly 150. With specific reference to FIG. 33, the ball joint 248 is received by the socket housing 408, and more specifically the socket 424 (see FIG. 31). The communication wire harness 296 exits the mounting housing 157 through the exit opening 288. The communication wire harness 296 extends around a portion of the mounting housing 157, and then engages the port assembly 428, and more specifically the port 432. The serpentine winding of the communication wire harness 296 around the mounting housing 157 provides strain relief on the communication wire harness 296.

The ball and socket connection between the motor assembly 150 and the wand assembly 400, and more specifically between the mounting housing 157 and the wand assembly 400, has certain advantages. The ball and socket connection allows for pivotal movement of the wand assembly 400 relative to the mounting housing 157. However, should sufficient force be applied to the wand assembly 400, the ball and socket connection will detach. For example, the socket 424 of the socket housing 408 will release (or disengage) from the ball joint 248. The release will avoid permanent damage to the wand assembly 400 and/or the mounting housing 157. A user is then free to reconnect the ball and socket connection (i.e., insert/reinsert the ball joint 248 into the socket 424 of the socket housing 408). The removable ball and socket connection also reduces the risk of permanent damage to the communication wire harness 296. If sufficient force is applied to the wand assembly 400, not only will the ball and socket connection release, but the communication wire harness 296 can disengage from the wand assembly 400. More specifically, the communication wire harness 296 can detach from engagement with the port 432 of the port assembly 428. A user can then reattach the communication wire harness 296 to the port assembly 428 by plugging the communication wire harness 296 into the port 432.

It should be appreciated that while the wand assembly 400 is illustrated as mounted to a motor assembly 150 associated with a roller shade, in other embodiments, the wand assembly 400, and the associated ball and socket connection can be associated with any type of motorized shade. Accordingly, the wand assembly 400 and the motor assembly 150, along with the ball and socket connection described herein, are not limited for use with a roller shade. The wand assembly 400, the motor assembly 150, and the ball and socket connection described herein can be used in association with any suitable type of motorized covering material or window shade, including, but not limited to, a cellular shade, a roller shade, Venetian blinds, Roman shades, a natural material (e.g., bamboo, etc.), or any motorized lift assembly for any other suitable window treatment or material that is configured to cover an architectural opening or a window, and limit, reduce, or block light, or otherwise serve as a shade.

Figure 34:
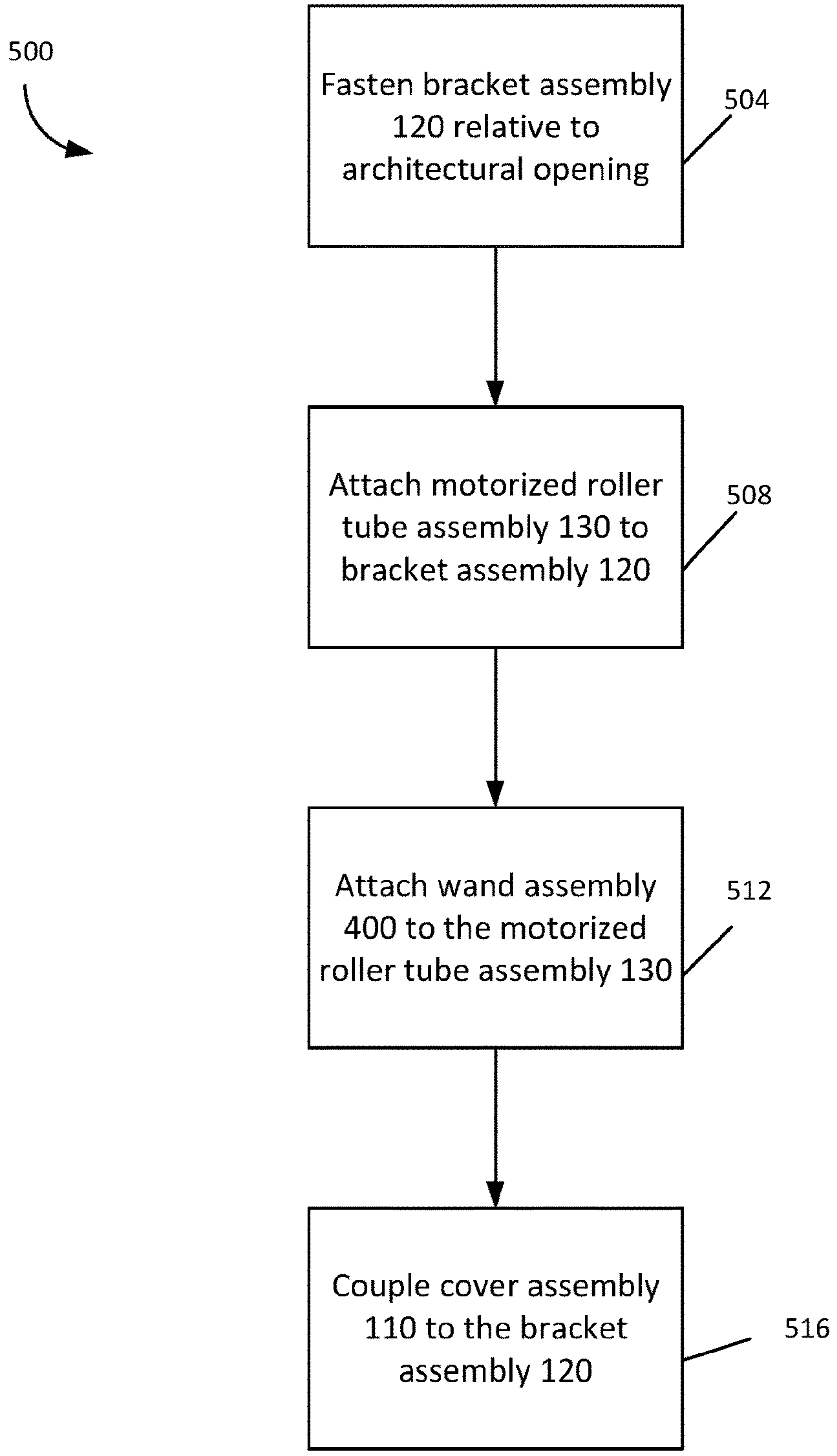
FIG. 34 is a flow diagram of an embodiment of a shade installation process for mounting the motorized roller shade assembly of FIG. 1 adjacent am architectural opening.

FIG. 34 illustrates an example of a shade installation process 500. More specifically, the shade installation process 500 depicts one or more steps for mounting the motorized roller shade assembly 100 relative to the architectural opening. The shade installation process 500 includes a series of instructions or steps that are depicted in flow diagram form.

Referring to FIG. 34, the process 500 begins with an installer (or user) fastening the bracket assembly 120 relative to (or adjacent to or near) the architectural opening. More specifically, the installer/user can mount (or otherwise fasten) each bracket member 122 to a location near the architectural opening. For example, each bracket member 122 can be fastened to a surface surrounding the architectural opening, such as a window frame or windowsill. As another example, each bracket member 122 can be fastened to a surface next to the architectural opening, such as a wall positioned adjacent to the architectural opening. Depending on the desired orientation of the bracket members 122, one or more fasteners can engage the first mounting face 125 or the second mounting face 126 of each bracket member 122.

Once the bracket assembly 120 is fastened (or mounted) near the architectural opening, the process 500 proceeds to step 508. At step 508, the motorized roller tube assembly 130 is attached (or mounted) to the bracket assembly 120. More specifically, the installer/user couples (or otherwise attaches) the first portion 132 (or non-rotating portion 132) to a first bracket member 122. The installer/user places the one or more mounting hooks 136 into engagement with the corresponding slots 129 of the bracket member 122. When each slot 129 receives the corresponding mounting hooks 136, the first portion 132 slides relative to the bracket member 122 to interlock the first portion 132 of the motorized roller tube assembly 130 with the bracket member 122. The installer/user than couples (or otherwise attaches) the second portion 134 (or rotating portion 134) to the other, second bracket member 122. The installer/user can depress the pin 142 of the idler member 140 by applying an external force (e.g., by using a finger, thumb, or other digit to depress the pin 142, etc.) sufficient to overcome the bias applied by the biasing member 147. Once the bias is overcome, the pin member 141 slides within the channel 145 of the tube engaging member 144 along the axis PA. Depressing the pin member 141 provides sufficient clearance (or space) to allow the second portion 134 to engage the other, second bracket member 122 while the first portion 132 remains engaged with the first bracket member 122. The installer/user can pivot the motorized roller tube assembly 130 to align the pin 142 of the pin member 141 with the aperture 128 of the second bracket member 122. Once generally aligned, the installer/user can remove the external force (e.g., remove the finger, thumb, or digit, etc.). The biasing member 147 applies biasing force to the pin member 141, sliding the pin member 141 along the axis PA away from the biasing member 147. The pin 142 is received by the aperture 128 of the second bracket member 122. This engages the second portion 134 to the second bracket member 122. The motorized roller tube assembly 130 is thus mounted to the bracket assembly 120. The motorized roller tube assembly 130 is configured to rotate relative to the axis PA. More specifically, the roller tube 137 is configured to rotate relative to the axis PA that is defined by the pin member 141, and more specifically defined by the pin 142.

Next, at step 512 installer/user can attach the wand assembly 400 to the motorized roller tube assembly 130. More specifically, the installer/user can connect the ball and socket connection by placing the ball joint 248 into engagement with the socket 424. The installer/user can also attach the communication wire harness 296 to the port assembly 428 to form the communication link between the wand assembly 400 and the motor assembly 150. The communication wire harness 296 can engage (or be plugged into) the port 432, forming the communication link from the plurality of control inputs 444 of the controller 440 to the printed circuit board 220 that is operably connected to the motor and drive assembly 208.

Finally, at step 516 the installer/user can attach the decorative cover assembly 110 to the bracket assembly 120. More specifically, the installer/user can attach the decorative housing 114 to cover (or enclose) the motorized roller tube assembly 130 and the end caps 118 to cover (or enclose) the bracket members 122.

Various features and advantages of the invention are set forth in the following claims.

What is claimed is:

1. A member configured to connect a roller tube of a roller shade to a motor, the member comprising:

a domed body defining a plurality of first outer walls and a plurality of second outer walls, the first outer walls being radially offset from the second outer walls; and a mounting hub defining an aperture through the domed body, the mounting hub aperture includes a first end positioned within an interior of the domed body and a second end positioned at an exterior of the domed body, the mounting hub is configured to engage a drive shaft of the motor.

2. The member of claim 1, wherein the first outer walls define a first circumference, the second outer walls define a second circumference, the first circumference being larger than the second circumference.

3. The member of claim 1, wherein the first outer walls and the second outer walls are concentric relative to the mounting hub.

4. The member of claim 1, wherein the first outer walls and the second outer walls alternate around the body.

5. The member of claim 1, wherein the plurality of first outer walls include at least two first outer walls.

6. The member of claim 5, wherein the plurality of second outer walls include at least two second outer walls.

7. The member of claim 1, wherein the plurality of first outer walls include at least four first outer walls.

8. The member of claim 7, wherein the plurality of second outer walls include at least four second outer walls.

9. The member of claim 1, wherein the mounting hub defines a plurality of locking teeth configured to directly fasten to the drive shaft of the motor, wherein the locking teeth are biased towards each other.

10. The member of claim 1, wherein the plurality of first outer walls of the domed body arcuately extend away from the second end of the mounting hub aperture.

11. The member of claim 1, wherein the plurality of first outer walls each include a first inner wall, and the plurality of second outer walls each include a second inner wall, the first and second inner walls being positioned within the interior of the domed body, the second inner walls being radially offset from the first inner walls.

12. The member of claim 11, wherein the second inner walls partially define a body recess, and wherein in response to the aperture of the mounting hub receiving the drive shaft of the motor, the body recess is configured to receive a portion of a housing of the motor.

13. The member of claim 1, further comprising a radial member extending radially outward from each first outer wall, the radial members configured to engage an inner surface of the roller tube.

14. A member configured to connect a motor to a roller tube of a roller shade comprising:

a domed body defining a plurality of first wall segments and a plurality of second wall segments, the first wall segments being radially offset from the second wall segments; and a mounting hub defining an aperture extending through the domed body, the mounting hub includes a first end positioned within an interior of the domed body and a second end projecting away from the domed body, the aperture extends from the first end to the second end of the mounting hub, wherein the aperture is configured to receive a drive shaft of the motor, and wherein the plurality of first wall segments of the domed body arcuately extend away from the second end of the mounting hub.

15. The member of claim 14, wherein the first wall segments alternate with the second wall segments around a circumference of the body.

16. The member of claim 14, wherein the plurality of first wall segments each define a first outer wall opposite a first inner wall, and the plurality of second wall segments each define a second outer wall opposite a second inner wall, the first inner walls of the first wall segments are arranged around a first circumference, the second inner walls of the second wall segments are arranged around a second circumference concentric with the first circumference, and the first inner walls and the second inner walls are positioned within an interior of the domed body.

17. The member of claim 16, wherein the second inner walls partially define a recess positioned within an interior of the domed body, the recess is configured to receive a portion of a housing of the motor.

18. The member of claim 14, wherein the member is configured to be received by the roller tube, and the plurality of first wall segments are configured to engage the roller tube.

19. The member of claim 14, further comprising a plurality of locking teeth defined by the mounting hub at a second end of the mounting hub, wherein the plurality of locking teeth are biased towards each other and are configured to engage the drive shaft.

20. The member of claim 14, further comprising at least one fin positioned on at least one of the first outer walls, the at least one fin extending radially outward from the at least one first outer wall, the at least one fin configured to engage an interior surface of the roller tube.

* * * * *